United States Patent
Taskiran et al.

(10) Patent No.: US 10,030,751 B2
(45) Date of Patent: Jul. 24, 2018

(54) INFINITE VARIABLE TRANSMISSION WITH PLANETARY GEAR SET

(71) Applicants: DANA LIMITED, Maumee, OH (US); Evrim Taskiran, Brussels (BE); Benoit Vandevoorde, Ghent (BE)

(72) Inventors: Evrim Taskiran, Brussels (BE); Benoit Vandevoorde, Ghent (BE); Matthias W. J. Byltiauw, Hooglede (BE); Mark R. J. Versteyhe, Oostkamp (BE); Thibaut E. Duchene, Woluwe-Saint-Lambert (BE)

(73) Assignee: Dana Limited, Maumee, OH (US)

( * ) Notice: Subject to any disclaimer, the term of this patent is extended or adjusted under 35 U.S.C. 154(b) by 269 days.

(21) Appl. No.: 15/036,555

(22) PCT Filed: Nov. 14, 2014

(86) PCT No.: PCT/US2014/065792
§ 371 (c)(1),
(2) Date: May 13, 2016

(87) PCT Pub. No.: WO2015/073883
PCT Pub. Date: May 21, 2015

(65) Prior Publication Data
US 2016/0290458 A1   Oct. 6, 2016

Related U.S. Application Data

(60) Provisional application No. 61/905,732, filed on Nov. 18, 2013, provisional application No. 62/004,756, (Continued)

(51) Int. Cl.
*F16H 37/08* (2006.01)

(52) U.S. Cl.
CPC ......... *F16H 37/086* (2013.01); *F16H 37/084* (2013.01); *F16H 2037/088* (2013.01); *F16H 2037/0886* (2013.01)

(58) Field of Classification Search
None
See application file for complete search history.

(56) References Cited

U.S. PATENT DOCUMENTS

| | | | |
|---|---|---|---|
| 1,063,244 | A | 6/1913 | Ludwig |
| 1,215,969 | A | 2/1917 | Murray |

(Continued)

FOREIGN PATENT DOCUMENTS

| | | |
|---|---|---|
| AU | 2011224083 A1 | 10/2011 |
| CN | 101392825 A | 3/2009 |

(Continued)

OTHER PUBLICATIONS

PCT/US2016/045857 International Search Report and Written Opinion dated Oct. 13, 2016.
(Continued)

*Primary Examiner* — Jacob S. Scott
(74) *Attorney, Agent, or Firm* — Marshall & Melhorn, LLC

(57) ABSTRACT

A variable transmission includes various powerpath layouts consisting in either; a single mode with approximately symmetrical reverse and forward speeds and includes an input shaft, one or two planetary gear sets, or a planetary gear set and a compound gear set when the RTS (ring-to-sun) ratio of the planetary gear set is not physically possible; or a dual mode with each mode being selected by closing a clutch/brake and releasing the other. A first up-speed planetary gear set on the input side of a variator, and a second planetary gear set on the output side of the variator, both configured to split the torque when drivingly engaged with (Continued)

a variator comprising, a first ring assembly, and a second ring assembly. Various up-speed ratio arrangements are shown that tend to increase the speeds and decrease the torque acting on the CVP, allowing a decrease in the variator size.

16 Claims, 28 Drawing Sheets

Related U.S. Application Data filed on May 29, 2014, provisional application No. 62/004,767, filed on May 29, 2014.

(56) References Cited

U.S. PATENT DOCUMENTS

| | | |
|---|---|---|
| 1,526,140 A | 2/1925 | Gruver |
| 2,019,006 A | 10/1935 | Ferrarl |
| 2,060,884 A | 11/1936 | Madle |
| 2,148,759 A | 2/1939 | Le Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Eklund et al. |
| 3,505,718 A | 4/1970 | Carlstrom |
| 3,583,060 A | 6/1971 | Sigmans |
| 3,688,600 A | 9/1972 | Leonard |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | Depuy |
| 4,046,988 A | 9/1977 | Okuda et al. |
| 4,056,988 A | 11/1977 | Kubo et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,405,117 B1 | 6/2002 | Walenty et al. |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo et al. |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,311,634 B2 | 12/2007 | Shim et al. |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |

(56) References Cited

U.S. PATENT DOCUMENTS

| | | |
|---|---|---|
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,052,000 B2 | 6/2015 | Cooper |
| 9,114,799 B2 | 8/2015 | Tsukamoto et al. |
| 9,156,463 B2 | 10/2015 | Legner et al. |
| 9,194,472 B2 | 11/2015 | Versteyhe et al. |
| 9,347,532 B2 | 5/2016 | Versteyhe et al. |
| 9,353,842 B2 | 5/2016 | Versteyhe et al. |
| 2002/0004438 A1 | 1/2002 | Toukura et al. |
| 2002/0094911 A1 | 7/2002 | Haka |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0276294 A1 | 12/2006 | Coffey et al. |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0185201 A1 | 8/2008 | Bishop |
| 2009/0017959 A1 | 1/2009 | Triller |
| 2009/0062064 A1 | 3/2009 | Kamada et al. |
| 2009/0112424 A1 | 4/2009 | Dahl et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca Alves et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0223901 A1 | 8/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0111693 A1 | 4/2015 | Wang et al. |
| 2015/0142281 A1 | 5/2015 | Versteyhe et al. |
| 2015/0159741 A1 | 6/2015 | Versteyhe et al. |
| 2015/0198246 A1 | 7/2015 | Callaway et al. |
| 2015/0204429 A1 | 7/2015 | Versteyhe et al. |
| 2015/0226294 A1 | 8/2015 | Ziech et al. |
| 2015/0226298 A1 | 8/2015 | Versteyhe et al. |
| 2015/0226299 A1 | 8/2015 | Cooper et al. |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0069442 A1 | 3/2016 | Versteyhe et al. |
| 2016/0109001 A1 | 4/2016 | Schoolcraft |
| 2016/0123438 A1 | 5/2016 | Ziech et al. |
| 2016/0131235 A1 | 5/2016 | Phillips |
| 2016/0185353 A1 | 6/2016 | Honma et al. |
| 2016/0281828 A1 | 9/2016 | Haka |
| 2016/0298737 A1 | 10/2016 | Versteyhe et al. |

FOREIGN PATENT DOCUMENTS

| | | |
|---|---|---|
| CN | 101479503 A | 7/2009 |
| CN | 101617146 A | 12/2009 |
| CN | 102297255 A | 12/2011 |
| CN | 102338208 A | 2/2012 |
| CN | 202165536 U | 3/2012 |
| CN | 202392067 U | 8/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 1174645 A2 | 1/2002 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2006109158 A1 | 10/2006 |
| WO | WO-2007046722 A1 | 4/2007 |

(56) References Cited

FOREIGN PATENT DOCUMENTS

| | | |
|---|---|---|
| WO | WO-2007051827 A1 | 5/2007 |
| WO | WO-2008101070 A2 | 8/2008 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

Co-pending U.S. Appl. No. 15/067,427, filed Mar. 11, 2016.
Co-pending U.S. Appl. No. 15/067,752, filed Mar. 11, 2016.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel. Proceedings of IMECE (1999) 6 pgs.
PCT/US2013/021890 International Preliminary Report on Patentability dated Jul. 31, 2014.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/015352 International Search Report and Written Opinion dated May 27, 2014.
PCT/US2014/025001 International Preliminary Report on Patent ability dated Sep. 24, 2015.
PCT/US2014/025001 International Search Report and Written Opinion dated Jul. 14, 2014.
PCT/US2014/025004 International Preliminary Report on Patentability dated Oct. 1, 2015.
PCT/US2014/025004 International Search Report and Written Opinion dated Jul. 14, 2014.
PCT/US2014/025005 International Preliminary Report on Patentability dated Oct. 1, 2015.
PCT/US2014/025005 International Search Report and Written Opinion dated Jul. 14, 2014.
PCT/US2014/026619 International Preliminary Report on Patentability dated Sep. 24, 2015.
PCT/US2014/026619 International Search Report and Written Opinion dated Sep. 9, 2014.
PCT/US2014/036621 International Preliminary Report on Patentability dated Nov. 12, 2015.
PCT/US2014/036621 International Search Report and Written Opinion dated Sep. 4, 2014.
PCT/US2014/036623 International Preliminary Report on Patentability dated Nov. 12, 2015.
PCT/US2014/036623 International Search Report and Written Opinion dated Sep. 4, 2014.
PCT/US2014/038439 International Preliminary Report on Patentability dated Nov. 26, 2015.
PCT/US2014/038439 International Search Report and Written Opinion dated Sep. 30, 2014.
PCT/US2014/041124 International Preliminary Report on Patentability dated Dec. 17, 2015.
PCT/US2014/041124 International Search Report and Written Opinion dated Oct. 15, 2014.
PCT/US2014/065792 International Preliminary Report on Patentability dated Jun. 2, 2016.
PCT/US2014/065792 International Search Report and Written Opinion dated Apr. 9, 2015.
PCT/US2014/065796 International Preliminary Report on Patentability dated Nov. 6, 2015.
PCT/US2014/065796 International Search Report and Written Opinion dated Apr. 9, 2015.
PCT/US2014/065909 International Search Report and Written Opinion dated Feb. 19, 2015.
PCT/US2014/065909 Written Opinion dated Dec. 11, 2015.

(56) References Cited

OTHER PUBLICATIONS

PCT/US2014/065909 Written Opinion dated Jun. 6, 2016.
PCT/US2015/36170 International Search Report and Written Opinion dated Dec. 17, 2015.
PCT/US2015/37916 International Search Report and Written Opinion dated Sep. 29, 2015.
PCT/US2015/64087 International Search Report and Written Opinion dated Feb. 11, 2016.
U.S. Appl. No. 13/743,951 Office Action dated Aug. 19, 2015.
U.S. Appl. No. 13/743,951 Office Action dated Jan. 21, 2016.
U.S. Appl. No. 13/743,951 Office Action dated Mar. 18, 2015.
U.S. Appl. No. 14/017,054 Office Action dated Aug. 27, 2014.
U.S. Appl. No. 14/017,054 Office Action dated Dec. 12, 2014.
U.S. Appl. No. 14/175,584 Office Action dated Apr. 2, 2015.
U.S. Appl. No. 14/175,584 Office Action dated Dec. 3, 2015.
U.S. Appl. No. 14/210,130 Office Action dated Jun. 7, 2016.
U.S. Appl. No. 14/210,130 Office Action dated Nov. 20, 2015.
U.S. Appl. No. 14/378,750 Office Action dated Apr. 8, 2016.
U.S. Appl. No. 14/425,598 Office Action dated Jun. 14, 2016.
U.S. Appl. No. 14/425,600 Office Action dated May 16, 2016.
U.S. Appl. No. 14/425,842 Office Action dated Jul. 1, 2016.
U.S. Appl. No. 14/426,139 Office Action dated Oct. 6, 2015.
U.S. Appl. No. 14/542,336 Office Action dated Nov. 25, 2015.
U.S. Appl. No. 15/067,752 Office Action dated Jun. 30, 2016.
U.S. Appl. No. 60/616,399, filed Oct. 5, 2004.
U.S. Appl. No. 61/819,414, filed May 3, 2013.
Wong. The Temple of VTEC Asia Special Focus on the Multimatic Transmission. Temple of VTEC Asia. (5 pgs.) (2000).
Co-pending U.S. Appl. No. 15/209,487, filed Jul. 13, 2016.
Co-pending U.S. Appl. No. 15/215,179, filed Jul. 20, 2016.
PCT/US2016/027496 International Search Report and Written Opinion dated Jul. 8, 2016.
PCT/US2016/29853 International Search Report and Written Opinion dated Aug. 8, 2016.
U.S. Appl. No. 14/334,538 Office Action dated Jul. 29, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.

Configuration 1 – Generic Layout

Configuration 1 – Speed diagram

Configuration 1 – Layout 1

Configuration 1 – Layout 2

Configuration 2 – Generic Layout

Configuration 2 – Speed diagram

Configuration 2 – Layout 1

Configuration 3 – Layout 1

Configuration 4 – Generic Layout

Configuration 4 – Speed diagram

Configuration 4 – Layout 1

Configuration 5 – Generic Layout

Configuration 5 – Layout 1

Configuration 6 – Generic Layout

Configuration 6 – Layout 1

| 2501 | Up-speed Ratio |
| 2502 | Carrier Ratio |
| 2503 | Coupling planetary |
| 2504 | CVT |
| 2505 | Input Coupling clutch |
| 2506 | Direct CVP clutch |
| 2507 | Common sun |
| 2508 | Carrier 1 |
| 2509 | Carrier 2 |

Configuration 7 – Layout 1

Configuration 8 – Generic Layout

Configuration 8 – Layout 1

Configuration 9 – Speed diagram

Configuration 9 – Layout 1

Directional clutch mechanism: Alternative 1

INFINITE VARIABLE TRANSMISSION WITH PLANETARY GEAR SET

CROSS-REFERENCES TO RELATED APPLICATIONS

The present application is a National Phase entry of International Application No. PCT/US2014/065792, filed on Nov. 14, 2014, which claims the benefit of U.S. Provisional Application No. 61/905,732, filed Nov. 18, 2013, U.S. Provisional Application No. 62/004,756, filed May 29, 2014, and U.S. Provisional Application No. 62/004,767, filed May 29, 2014 all of which applications are incorporated herein by reference in their entireties.

BACKGROUND OF THE INVENTION

Automatic and manual transmissions are commonly used on automobile vehicles. Those transmissions are becoming more and more complicated since the engine speed has to be more precisely controlled to limit the fuel consumption and the emissions of cars. This finer control of the engine speed in usual transmissions can only be done by adding more discrete step ratio gears and increasing the overall complexity and cost. Consequently, 6-speed manual transmissions then become more frequently used as are 8 or 9 speed automatic transmissions.

SUMMARY OF THE INVENTION

Provided herein is a variable transmission comprising: an input shaft, a first planetary gear set comprising a first carrier drivingly engaged to the input shaft, a first sun gear drivingly engaged to a first set of planet gears which are engaged to a first ring gear, wherein the first ring gear is fixed to a first casing of the first planetary gear set, and wherein a first ring assembly of a variator is drivingly engaged to the first sun of the first planetary gear set; the variator comprising the first ring assembly and a second ring assembly that is drivingly engaged to a second sun gear of a second planetary gear set; and the second planetary gear set comprising the second sun that is drivingly engaged to a second set of planet gears, and a second carrier coupled to the input shaft, wherein the second set of planet gears is drivingly engaged to a second ring gear of the second planetary gear set, and wherein said second ring gear is mechanically coupled to a differential.

In some embodiments, the variable transmission comprises an infinitely variable mode.

In some embodiments of the variable transmission, the first planetary is an up-speed planetary gear set. In some embodiments of the first planetary gear set, the output of speed of said first planetary gear set is greater than the input shaft speed.

In some embodiments of the variable transmission, the second planetary gear set is a coupling planetary gear set, wherein the output of the variator is coupled to the sun of the second planetary gear set and the input shaft through the carrier of the second planetary gear set.

In some embodiments of the variable transmission, part of the power will pass through the variator, the secondary planetary sun, planet gears and ring gear, and part of the power will pass directly through the secondary planetary carrier, planet gears and ring gear.

In some embodiments of the variable transmission the carrier of the second planetary gear set turns at the same speed as the input shaft.

In some embodiments of the variable transmission the sun gear of the second planetary gear set is coupled to the output of the second ring assembly of the variator and is turning at a speed range between the input shaft speed times the minimum ratio of the variator, times the up-speed ratio of the first planetary gear set and the input shaft speed, times the maximum speed ratio of the variator times the up-speed ratio of the first planetary gear set.

In some embodiments of the variable transmission, the power output going to the differential from the ring of the second planetary can go from forward speeds to reverse speeds through standstill thereby providing an infinitely variable mode.

Provided herein is a variable transmission comprising: an input shaft, a first gear set comprising a first gear drivingly engaged to the input shaft, a countershaft, a second gear, and a third gear, wherein the first gear is drivingly engaged to the second gear, wherein the second gear is drivingly engaged to the third gear through the countershaft and the third gear is drivingly engaged to a fourth gear; a variator comprising a first ring assembly which is drivingly engaged to the fourth gear, and a second ring assembly that is drivingly engaged to a sun gear of a planetary gear set; and the planetary gear set comprising the sun gear, a ring gear, a set of planet gears drivingly engaged to the sun, and a carrier coupled to the set of planet gears and to the input shaft, wherein the set of planet gears are drivingly engaged to the ring gear, and wherein the ring gear is mechanically coupled to a differential.

In some embodiments of the variable transmission, the transmission comprises an infinitely variable mode.

In some embodiments of the variable transmission, the first gear set is an up-speed gear set. In some embodiments of the variable transmission the output of speed of said gear set is greater than the input shaft speed.

In some embodiments of the variable transmission, the planetary gear set is a coupling planetary gear set, wherein the output of the variator is coupled to the sun of the planetary gear set and the input shaft to the carrier of the planetary gear set.

In some embodiments of the variable transmission, part of the power will pass through the variator, the planetary sun, planet gears and ring gear, and part of the power will pass directly through the planetary carrier, planet gears and ring gear.

In some embodiments of the variable transmission, the carrier of the planetary gear set turns at the same speed as the input shaft.

In some embodiments of the variable transmission, the carrier turns within a speed range between a speed of the input shaft, multiplied by an up-speed ratio of the planetary gear set and the speed of the input shaft multiplied by the up-speed ratio of the planetary gear set.

In some embodiments of the variable transmission, the sun gear of the planetary gear set is coupled to the output of the second ring assembly of the variator and is turning at a speed range between the input shaft speed times the minimum ratio of the variator, times the up-speed ratio of the gear set, and the input shaft speed, times the maximum speed ratio of the variator times the up-speed ratio of the gear set.

In some embodiments of the variable transmission, the power output going to the differential from the ring of the planetary can go from forward speeds to reverse speeds through standstill thereby providing an infinitely variable mode.

In some embodiments of the variable transmission, the variator is connected to the sun of the planetary directly on one side and to the input shaft through an up-speed ratio gear set on the other side.

In some embodiments, the variable transmission of either configuration previously described, the up-speed ratio increases the speeds acting on the variator.

In some embodiments, the variable transmission of either configuration previously described, the up-speed ratio decreases the torque acting on the variator.

In some embodiments, the variable transmission of either configuration previously described, a minimum speed ratio in the variator brings the ring speed of the planetary gear set on the output side of the variator to its maximum forward speed while the maximum speed ratio in the variator brings the ring speed of the planetary gear set on the output side of the variator to its maximum reverse speed.

In some embodiments of the variable transmission of either configuration previously described, the transmission further comprises a torsional damper which is drivingly connected to an input power source, wherein said torsional damper is located between the input power source and the variator to avoid transferring torque peaks and vibrations. In still further embodiments, said torsional damper is coupled with a clutch.

Provided herein is a variable transmission comprising: an input shaft, a first gear set comprising a first gear, second gear, and a countershaft, wherein the first gear is drivingly engaged to the input shaft, wherein the first gear is drivingly engaged to the second gear, and wherein the second gear is drivingly engaged to the countershaft; a variator comprising a first ring assembly drivingly engaged to the countershaft, a second ring assembly drivingly engaged to a third gear of a second gear set, wherein said variator is disposed on said countershaft; the second gear set comprising the third gear drivingly engaged to a fourth gear on an output shaft that is drivingly engaged to a sun of a planetary gear set; and the planetary gear set comprising a carrier, the sun gear, a set of planet gears, and a ring gear, wherein the sun gear is drivingly engaged to the set of planet gears, wherein the carrier is coupled to the input shaft, wherein the set of planet gears are drivingly engaged to the ring gear, and wherein the ring gear is mechanically coupled to a differential.

In some embodiments of the variable transmission, the transmission comprises an infinitely variable mode.

In some embodiments of the variable transmission, the first gear set is an up-speed gear set. In some embodiments of the variable transmission, the output speed of said first gear set is greater than the input shaft speed.

In some embodiments of the variable transmission, the planetary gear set is a coupling planetary gear set, wherein the output shaft is coupled to the sun and the input shaft through the carrier of the planetary gear set.

In some embodiments of the variable transmission, part of the power will pass through the variator, the planetary sun, planet gears and ring gear, and part of the power will pass directly through the planetary carrier, planet gears and ring gear.

In some embodiments of the variable transmission, the carrier of the planetary gear set turns at the same speed as the input shaft.

In some embodiments of the variable transmission, the sun gear of the planetary gear set is coupled to the output shaft and is turning at a speed range between the input shaft speed times the minimum ratio of the variator, times ratios of the first gear set and the second gear set and the input shaft speed, times the maximum speed ratio of the variator times ratios of the first gear set and the second gear set.

In some embodiments of the variable transmission, the power output going to the differential from the ring of the planetary can go from forward speeds to reverse speeds through standstill thereby providing an infinitely variable mode.

In some embodiments of the variable transmission, the variator is connected to the sun of the planetary through a speed ratio on one side and to the input shaft through a speed ratio on the other side of the variator.

In some embodiments of the variable transmission, the first gear set ratio causes the variator to turn the opposite direction of the input shaft, wherein the second gear set ratio causes the output of the variator to turn in the same direction as the input shaft.

In some embodiments of the variable transmission, the up-speed ratio of the first gear set increases the speeds acting on the variator.

In some embodiments of the variable transmission, the up-speed ratio of the first gear set decreases the torque acting on the variator.

In some embodiments of the variable transmission, a minimum speed ratio in the variator brings the ring speed of the planetary gear set on the output side of the variator to its maximum forward speed while the maximum speed ratio in the variator brings the ring speed of the planetary gear set on the output side of the variator to its maximum reverse speed.

In some embodiments, the variable transmission further comprises a torsional damper drivingly connected to an input power source, wherein said torsional damper is located between the input power source and the variator to avoid transferring torque peaks and vibrations. In still other embodiments, said torsional damper is coupled with a clutch.

Provided herein is a variable transmission comprising: an input shaft comprising a first gear and a second gear; said first gear is drivingly engaged to a first gear set on a second shaft; a first ring assembly of a variator is drivingly engaged to said first gear set comprising a third gear; said variator comprising a first ring assembly and a second ring assembly, wherein said variator is disposed on said second shaft; said second ring assembly is drivingly engaged to a sun gear of a planetary gear set, wherein the sun of said planetary gear set is drivingly engaged to a set of planet gears; a carrier of the planetary gear set is coupled to a fourth gear of a second gear set; said fourth gear is drivingly engaged to the second gear on the input shaft; the set of planet gears of the planetary gear set are driving engaged to the ring gear of the planetary gear set; and said ring gear is mechanically coupled to a fifth gear on a third shaft, wherein said third shaft comprises the fifth and a sixth gear; and said sixth gear is mechanically linked to a differential.

In some embodiments of the variable transmission, the transmission comprises an infinitely variable mode.

In some embodiments of the variable transmission, the first gear set is an up-speed gear set.

In some embodiments of the variable transmission, the output speed of said first gear set is greater than the input shaft speed.

In some embodiments of the variable transmission, the planetary gear set is a coupling planetary gear set, wherein the output of the variator is coupled to the sun of the planetary gear set and the input shaft through a second gear set to the carrier of the planetary gear set.

In some embodiments of the variable transmission, part of the power will pass through the variator, the planetary sun, planet gears and ring gear, and part of the power will pass directly through the planetary carrier, planet gears and ring gear.

In some embodiments of the variable transmission, the second gear set is a down-speed gear set.

In some embodiments of the variable transmission, the carrier of the planetary gear set is linked to the input shaft through the second gear set and turns at the same speed as the input shaft times the ratio of the second gear set.

In some embodiments of the variable transmission, the sun gear of the planetary gear set is coupled to the output of the second ring assembly of the variator and is turning at a speed range between the input shaft speed times the minimum ratio of the variator, times the up-speed ratio of the first gear set and speed of the input shaft, times the maximum speed ratio of the variator times the up-speed ratio of the first gear set.

In some embodiments of the variable transmission, the power output going to the differential from the ring of the planetary can go from forward speeds to reverse speeds through standstill thereby providing an infinitely variable mode.

In some embodiments of the variable transmission, the variator is connected to the sun of the planetary through a direct connection on one side and to the input shaft through a down-speed ratio on the other side.

In some embodiments of the variable transmission, the first gear set ratio causes the variator to turn the opposite direction of the input shaft.

In some embodiments of the variable transmission, the up-speed ratio of the first gear set increases the speeds acting on the variator.

In some embodiments of the variable transmission, the up-speed ratio of the first gear set decreases the torque acting on the variator.

In some embodiments of the variable transmission, a minimum speed ratio in the variator brings the ring speed of the planetary gear set on the output side of the variator to its maximum forward speed while the maximum speed ratio in the variator brings the ring speed of the planetary gear set on the output side of the variator to its maximum reverse speed.

In some embodiments of the variable transmission, the transmission further comprises a torsional damper drivingly connected to an input power source, wherein said torsional damper is located between the input power source and the variator to avoid transferring torque peaks and vibrations. Still further, said torsional damper is coupled with a clutch.

Provided herein is a variable transmission comprising: an input shaft having a first gear coupled thereto; a first planetary gear set comprising a first carrier drivingly engaged to the input shaft, a first set of planet gears drivingly engaged to the first carrier, a first sun gear drivingly engaged to the first set of planet gears, and a first ring gear is fixed to a casing of the first planetary gear set; a variator comprising a first ring assembly that is drivingly engaged to the first sun gear, a second ring assembly that is drivingly engaged to an output shaft coupled to a second sun gear of a second planetary gear set; the second planetary gear set comprising the second sun gear that is drivingly engaged to two sets of shared planet gears, a shared carrier that is drivingly engaged to the two sets of shared planet gears, wherein said second planetary gear set is a compound planetary gear set; a countershaft having a second gear and third gear coupled thereto, wherein the shared carrier is drivingly engaged to a fourth gear which is drivingly engaged to the second gear, and wherein the third gear is drivingly coupled to the first gear on the input shaft; wherein the set of shared planet gears are driving engaged to a third sun gear of the second planetary gear set; and said third sun gear is mechanically coupled to a differential.

In some embodiments of the variable transmission, the transmission comprises an infinitely variable mode.

In some embodiments of the variable transmission, the first planetary gear set is an up-speed gear set.

In some embodiments of the variable transmission, the output speed of said first planetary gear set is greater than the input shaft speed.

In some embodiments of the variable transmission, the second planetary gear set is a coupling compound planetary gear set, wherein the output of the variator is coupled to the first sun of the compound planetary gear set and the input shaft through the countershaft through first gear, second gear and third gear to the shared carrier of the compound planetary gear set.

In some embodiments of the variable transmission, part of the power will pass through the first planetary gear set, the variator, the second planetary gear set first sun, the shared planet gears and second sun gear, and part of the power will pass directly through the second planetary gear set carrier, shared planet gears and second sun gear.

In some embodiments of the variable transmission, the carrier of the first planetary gear set turns at the same speed as the input shaft.

In some embodiments of the variable transmission, the first sun gear of the second planetary gear set is coupled to the output of the second ring assembly of the variator and is turning at a speed range between the input shaft speed times the minimum ratio of the variator, times the up-speed ratio of the first planetary gear set and the input shaft speed, times the maximum speed ratio of the variator times the up-speed ratio of the first planetary gear set.

In some embodiments of the variable transmission, the power output going to the differential from the second sun of the second planetary gear set can go from forward speeds to reverse speeds through standstill thereby providing an infinitely variable mode.

In some embodiments of the variable transmission, the variator is connected to the sun of the second compound planetary with a direct connection on one side and to the input shaft through a down-speed ratio on the other side.

Provided herein is a variable transmission comprising: an input shaft comprising a first gear of a first gear set and coupled to a first portion of a first clutch; the first gear set comprising the first gear and a second gear; a variator comprising a first ring assembly drivingly engaged to the second gear, and a second ring assembly coupled to a ring gear of a planetary gear set and coupled to a second portion of a second clutch; the planetary gear set comprising the ring gear, a carrier coupled to a third portion of the second clutch; a set of planet gears drivingly engaged to the carrier; and a sun gear drivingly engaged with the set of planet gears, wherein said planetary gear set is a coupling planetary gear set; and a second gear set comprising a third gear drivingly engaged to the carrier, and a fourth gear coupled to a fourth portion of the first clutch, and the sun gear is mechanically coupled to a differential.

In some embodiments of the variable transmission, the first gear set is an up-speed ratio gear set. In some embodiments of the variable transmission, the second gear set is a down-speed ratio gear set.

In some embodiments of the variable transmission, the carrier is connected to the input shaft when the first clutch is engaged.

Provided herein is a variable transmission comprising: an input shaft comprising a first gear of a first gear set and coupled to a first portion of a first clutch; the first gear set comprising the first gear and a second gear; a variator comprising a first ring assembly drivingly engaged to the second gear, and a second ring assembly coupled to a ring gear of a planetary gear set and coupled to a second portion of a second clutch; the planetary gear set comprising the ring gear, a carrier coupled to a third portion of the second clutch; a set of planet gears drivingly engaged to the carrier; and a sun gear drivingly engaged with the set of planet gears, wherein said planetary gear set is a coupling planetary gear set; and a second gear set comprising a third gear drivingly engaged to the carrier, and a fourth gear coupled to a fourth portion of the first clutch, and the sun gear is mechanically coupled to a fifth gear, wherein said fifth gear is mechanically coupled to a differential.

In some embodiments of the variable transmission, the first gear set is an up-speed ratio gear set. In some embodiments of the variable transmission, the second gear set is a down-speed ratio gear set.

In some embodiments of the variable transmission, the carrier is connected to the input shaft when the first clutch is engaged.

In some embodiments of the variable transmission, the fifth gear is a −1 ratio gear.

Provided herein is a variable transmission comprising: an input shaft comprising a first gear of a first gear set coupled to a first portion of a first clutch and a second gear of a second gear set coupled to a second portion of said first clutch; the first clutch comprising a first portion and a second portion; the first gear set comprising the first gear and a third gear; the second gear set comprising the second gear and a fourth gear; a variator comprising a first ring assembly drivingly engaged to the third gear, and a second ring assembly coupled to a common sun gear of a compound planetary gear set; the compound planetary gear set comprising a common sun, a second set of planet gears, coupled to a second carrier, said second carrier coupled to a third portion of a second clutch, wherein a fourth portion of said second clutch is fixed to ground; a first set of planet gears, coupled to a first carrier, wherein said first carrier is drivingly engaged to the fourth gear of said second gear set, and said common sun is drivingly engaged to the second set of planet gears and the first set of planet gears, wherein said second set of planet gears and said first set of planet gears are drivingly engaged to the ring gear, wherein said compound planetary gear set is a coupling planetary gear set; and the ring gear is mechanically coupled to a differential.

The input is always linked to the up-speed ratio going to the CVP and to the first member of the input coupling clutch (to engage the "reverse mode"). The CVP output is linked to the sun of the compound planetary (sun common for both planes of gears). A clutch allows braking of the second carrier to engage the direct forward mode. The first carrier of the planetary is linked to the down-speed ratio and would thus be connected to the ICE (internal combustion engine or any other power plant) when the input coupling clutch is engaged, engaging the input coupling mode (reverse mode). The ring of the planetary is connected to the output of the transmission.

In some embodiments of the variable transmission, the first gear set is an up-speed ratio gear set. In some embodiments of the variable transmission, the second gear set is a down-speed ratio gear set.

In some embodiments of the variable transmission, the reverse mode is achieved when said first clutch is engaged.

In some embodiments of the variable transmission, the direct forward mode is achieved when said second clutch is engaged to allow braking of the second carrier.

In some embodiments of the variable transmission, the up-speed ratio of the first gear set increases the speeds acting on the variator.

In some embodiments of the variable transmission, the up-speed ratio of the first gear set decreases the torque acting on the variator.

In some embodiments of the variable transmission, a minimum speed ratio in the variator brings the ring speed of the planetary gear set on the output side of the variator to its maximum forward speed while the maximum speed ratio in the variator brings the ring speed of the planetary gear set on the output side of the variator to its maximum reverse speed.

Provided herein is a variable transmission comprising: an input shaft comprising a first gear of a first gear set drivingly engaged to a second gear; the first gear set comprising the first gear and the second gear; the second gear is coupled to a third gear of a second gear set; the second gear set comprising the third gear and a fourth gear; the third gear is drivingly engaged to a first ring assembly of a variator, which is coupled to a second ring assembly which is drivingly engaged to a sun gear of a coupling planetary gear set, creating a third gear set; the coupling planetary gear set comprising a common sun, a set of planet gears coupled to a carrier and a ring gear; wherein the carrier is linked to an internal combustion engine through the fourth gear of the second gear set and the ring of the coupling planetary gear set is mechanically coupled to a differential of the transmission.

In some embodiments, the first gear set is an up-speed ratio gear set.

In some embodiments, the second gear set is a down-speed ratio gear set for the internal combustion engine and is the product of the first and second gear set ratios.

In some embodiments, the third gear set, is a down-speed gear ratio.

In some embodiments, multiple power paths will be used at the same time. A part of the power will flow through the CVP, the planetary sun, the planets and go out through the ring; while a certain amount of the power will directly flow through the carrier, planets and ring of the planetary. In addition, the closed loop present in the configuration will allow some power to recirculated, degrading the efficiency for certain ratios, resulting in ratios giving negative speeds on the ring.

In some embodiments of the variable transmission, the transmission further comprises a torsional damper drivingly connected to an input power source, wherein said torsional damper is located between the input power source and the variator to avoid transferring torque peaks and vibrations. In still other embodiments, said torsional damper is coupled with a clutch.

In any one of the previously described embodiments, said transmission provides a powered neutral ratio.

Provided herein is a variable transmission comprising a first stage comprising; an input shaft, a first gear set comprising a first gear, a second gear and a countershaft, wherein the first gear is drivingly engaged to the input shaft and drivingly engaged to the second gear, and wherein the second gear is drivingly engaged to the countershaft; a variator comprising a first ring assembly drivingly engaged to the countershaft, a second ring assembly drivingly engaged to a third gear of a second gear set, wherein said variator is disposed on the countershaft; the second gear set comprising the third gear drivingly engaged to a fourth gear, wherein the fourth gear is drivingly engaged to a planetary output shaft that is drivingly engaged to a sun gear of a planetary gear set; and the planetary gear set comprising a carrier, the sun gear, a set of planet gears, and a ring gear, wherein the sun gear is drivingly engaged to the set of planet gears, wherein the carrier is coupled to the input shaft, wherein the set of planet gears are drivingly engaged to the ring gear, wherein the ring gear is drivingly engaged to a second stage comprising; a forward/reverse mechanism, wherein the second stage forward/reverse mechanism is mechanically coupled to a transmission output.

In some embodiments, the variable transmission comprises an infinitely variable mode.

In some embodiments, the first gear set is an up-speed gear set. In some embodiments, an output speed of said first gear set is greater than an input speed of the input shaft.

In some embodiments, the planetary gear set is a coupling planetary gear set, wherein the output shaft is coupled to the sun and the input shaft is coupled through the carrier of the planetary gear set.

In some embodiments, a first part of the power from a power source will pass through the variator, the sun, the set of planet gears, the ring gear, and a second part of the power will pass directly through the carrier, the set of planet gears, and the ring gear.

In some embodiments, the carrier turns at the same speed as an input speed of the input shaft.

In some embodiments, the sun gear turns at a speed range between a speed of the input shaft multiplied by a minimum speed ratio of the variator multiplied by ratios of the first gear set and the second gear set, and the speed of the input shaft multiplied by a maximum speed ratio of the variator multiplied by the ratios of the first gear set and the second gear set.

In some embodiments, a power output going to the forward/reverse mechanism from the ring gear can go from forward direction to reverse direction through standstill thereby providing an infinitely variable mode.

In some embodiments, the variator is connected to the sun through a speed ratio of the second gear set on one side of the variator and connected to the input shaft through a speed ratio of the first gear set on the other side of the variator.

In some embodiments, a first gear set ratio of the first gear set causes the variator to turn the opposite direction of the input shaft, wherein the second gear set ratio of the second gear set causes the output of the variator to turn in the same direction as the input shaft.

In some embodiments, an up-speed ratio of the first gear set increases the speeds acting on the variator. In some embodiments, an up-speed ratio of the first gear set decreases the torque acting on the variator.

In some embodiments, the second stage forward/reverse mechanism comprises a planetary gear set. In some embodiments, the second stage planetary gear set comprises a sun gear, a first set and a second set of planetary gears, a carrier, a ring gear, a forward directional clutch, a reverse directional clutch and an output shaft, wherein the sun gear is mounted on the output shaft and is drivingly engaged to the first set of planetary gears which are drivingly engaged to the second set of planetary gears, wherein the carrier is coupled to a reverse directional clutch on one side of the planetary gear set and wherein the second set of planetary gears are drivingly engaged to the ring gear which is coupled to a forward directional clutch on the other side of the planetary gear set, wherein the second stage planetary ring gear is driven by the ring gear of the coupling planetary gear set, and wherein the output shaft is coupled to the transmission output.

In some embodiments, the second stage forward/reverse mechanism comprises a forward gear, a reverse gear, a first idler gear, a second idler gear, an idler shaft, a forward directional clutch, a reverse directional clutch and an output shaft, wherein the forward gear is mounted on the output shaft and drivingly engaged by the ring gear of the coupling planetary gear set, wherein the forward gear is coupled to a forward clutch on one side of the second stage forward/reverse mechanism, the first idler gear is mounted on the idler shaft and drivingly engaged to the ring gear, and wherein the second idler gear is driven on the idler shaft and drivingly engaged to the reverse gear mounted about the output shaft and coupled to a reverse clutch on the other side of the second stage forward/reverse mechanism, and wherein the output shaft is coupled to the transmission output.

In some embodiments, the first stage of the transmission produces a speed range between a small negative speed and a maximum positive speed.

In some embodiments, the second stage forward/reverse mechanism produces maximum reverse speeds by mirroring the asymmetrical speed range of the first stage.

In some embodiments, the gear ratio of the second stage forward/reverse mechanism can be changed to reduce the maximum forward and reverse speeds.

In some embodiments, the variable transmission further comprises a torsional damper, wherein said torsional damper is located between an input power source and the variator to avoid or reduce transferring torque peaks and vibrations from the input power source to one or more of the input shaft, the first gear set, the variator, the second gear set, and the planetary gear set.

In some embodiments, the torsional damper is coupled with a clutch.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Continuously Variable Transmissions or CVTs are of many types: belts with variable pulleys, toroidal, and conical, for non-limiting example. The principle of a CVT is that it enables the engine to run at its most efficient rotation speed by changing steplessly the transmission ratio in function of the speed of the car and the torque demand (throttle position) of the driver. If needed for example when accelerating, the CVT can also shift to the most optimum ratio providing more power. A CVT can change the ratio from the minimum to the maximum ratio without any interruption of the power transmission, as opposed to usual transmissions which require an interruption of the power transmission by disengaging to shift from one discrete ratio to engage the next ratio.

A specific use of CVTs is the Infinite Variable Transmission or IVT. Where the CVT is limited at positive speed ratios, the IVT configuration can perform a neutral gear and even reverse steplessly. A CVT can be used as an IVT in some driveline configurations.

Figure 1:
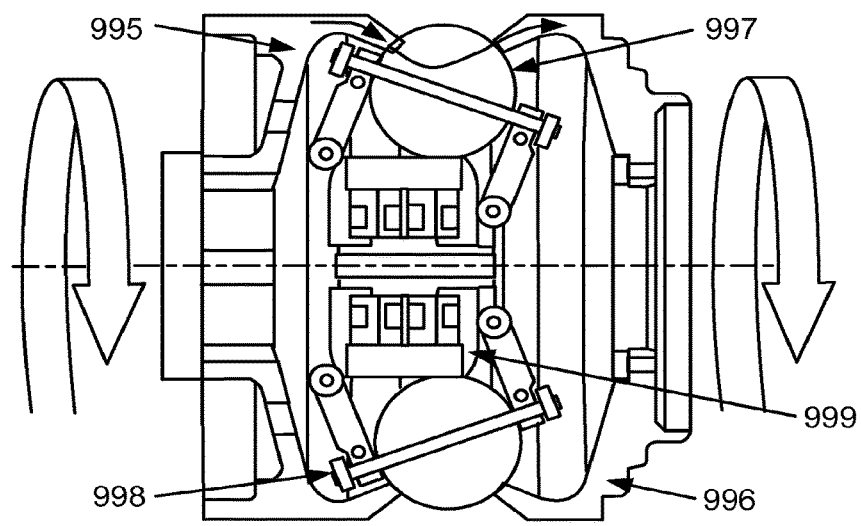
FIG. 1 is an illustrative side sectional view of a continuously variable planetary (CVP) transmission comprising an input ring 995, an output ring 996, balls 997, axles 998, and optionally, an idler, 999.
Figure 2:
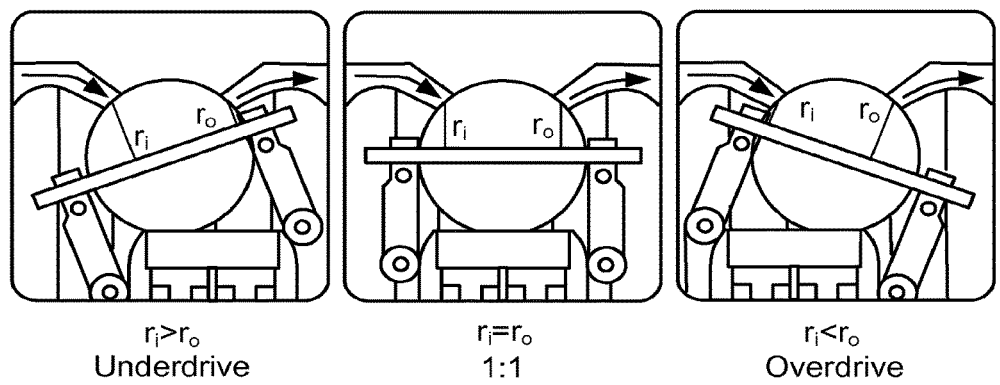
FIG. 2 is an illustrative magnified, side sectional view of a ball and ring of the CVP transmission of FIG. 1.

Provided herein are configurations based on a ball type CVT, also known as CVP (for constant variable planetary) or a variator, herein. Aspects of an example CVT are described in US2006084549 or AU2011224083A1, incorporated herein by reference in their entirety. The type of CVT used herein is comprised a variator comprising a plurality of variator balls, depending on the application, two discs or annular rings (i.e. a first ring assembly and a second ring assembly) each having an engagement portion that engages the variator balls. The engagement portions may be in a conical or toroidal convex or concave surface contact with the variator balls, as input and output. The variator may include an idler contacting the balls as well as shown on FIG. 1. The variator balls are mounted on axes, themselves held in a cage or carrier allowing changing the ratio by tilting the variator balls' axes. Other types of ball CVTs also exist, like the one produced by Milner but are slightly different. These alternative ball CVTs are additionally contemplated herein. The working principle generally speaking, of a ball-type variator of a CVT is shown in FIG. 2.

The variator itself works with a traction fluid. The lubricant between the ball and the conical rings acts as a solid at high pressure, transferring the power from the first ring assembly, through the variator balls, to the second ring assembly. By tilting the variator balls' axes, the ratio can be changed between input and output. When the axis of each of the variator balls is horizontal the ratio is one, when the axis is tilted, the distances between the axis and the contact points change, modifying the overall ratio. All the variator balls' axles are tilted at the same time with a mechanism included in the cage.

Figure 3:
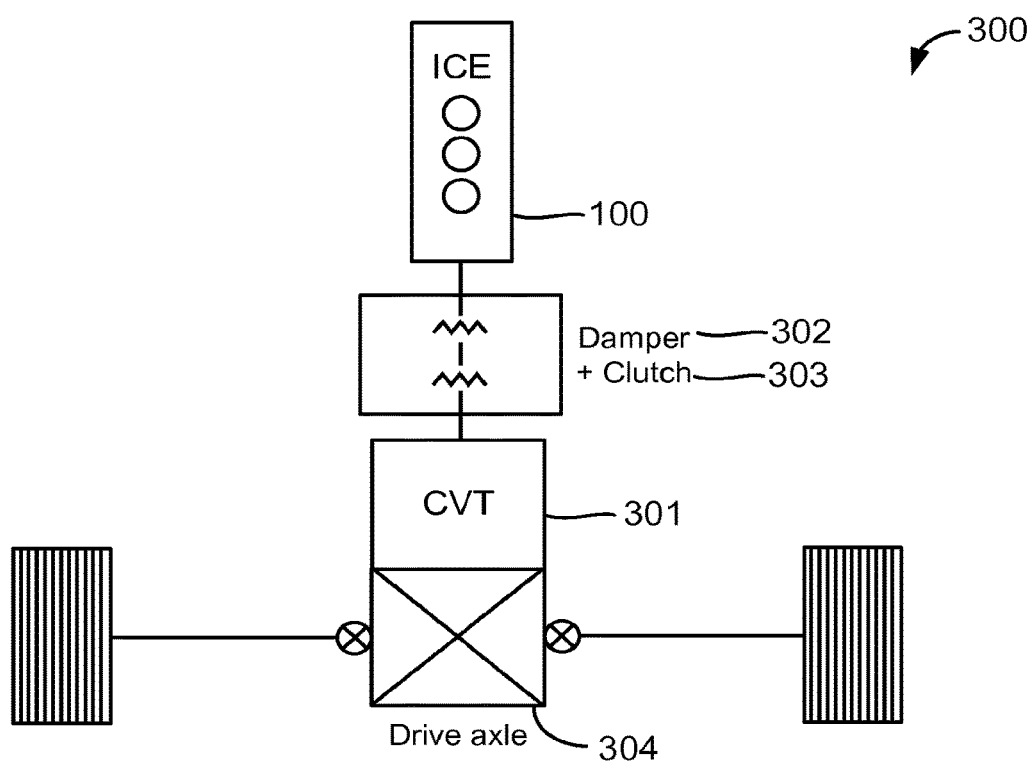
FIG. 3 is a block diagram of a continuously variable transmission (CVT) used in a vehicle and an off-highway (OH) drivetrain.

As in a car 300, the CVT 301 is used to replace the traditional transmission and is located between the engine 100 (an internal combustion engine (ICE) or any other power plant) and the differential 304 as shown in FIG. 3. In a typical drivetrain for an Off-Highway (OH) vehicle, a torsional damper 302 (alternatively called a damper) is introduced between the engine 100 and the CVT 301 to avoid transferring torque peaks and vibrations that could seriously damage the variator 301. In some configurations this damper 302 can be coupled with a clutch 303 for the starting function or to allow the engine to be decoupled from the transmission. Other types of CVT's (apart from ball-type traction drives) can also be used as the variator.

In addition to the configurations described, where the variator is used directly as the primary transmission, other architectures are possible. Various powerpath layouts can be introduced by adding a number of gears, clutches and simple or compound planetary gear sets. In such configurations, the overall transmission can provide several operating modes; a CVT, an IVT, a combined mode and so on.

Introduced within this specification are different layouts based on the same principle of using a planetary connected to the ICE and the CVP to allow powersplitting. Several examples of architectures are proposed, but the invention is not restricted to these examples and it is assumed that all the layouts that perform similarly to the speed diagrams and generic layouts are part of the invention as well.

This coupling allows having a better efficiency in one part of the output range, typically the forward part, due to the powersplitting. Additionally, these configurations and their different layouts provide a powered neutral ratio. The spread given through them is sufficient to allow the engine to operate at more optimal points, providing fuel economy, while keeping the same operating speeds.

These configurations typically provide a symmetrical range of positive and negative speeds, a feature that is present in many applications such as forklifts. However, modifications of ratios in the gears and planetary gear sets might provide different forward and reverse speed, allowing the use of these configurations in different applications.

The present invention relates to various powerpath layouts consisting in a single mode with approximately symmetrical reverse and forward speeds. These configurations may be used for forklift trucks that typically drive the same speed in forward and in reverse, but may also be used for other applications. Additionally, the approximately symmetrical speed characteristic of these configurations is only due to the particular gear ratios chosen. A different set of gear ratios might provide different forward and reverse speed while keeping the same configuration, allowing it to be used in other applications.

The carrier assembly of the variator of FIGS. 6, 7, 10, 13, 16, 19, 22, 25 and 28 may be rotatably disposed in the housing. The carrier assembly comprises an annular arrangement of the plurality of tiltable variator balls each having tiltable ball axle shafts. In some embodiments, each of the ball axle shafts is adjusted using a cam style tilting mechanism. In some embodiments, each of the ball axle shafts is adjusted using a split carrier axle skewing mechanism.

As depicted in FIGS. 6, 7, 10, 13, 16, 19, 22, 25 and 28, at least, a second ring assembly is rotatably disposed in the housing. The second ring assembly comprises a second variator ball engagement surface that is in driving engagement with variator balls of the carrier assembly. In some embodiments, the second variator ball engagement surface is formed in a distal end of the second ring assembly. In some embodiments, the second variator ball engagement surface is a conical surface or a concave or convex toroidal surface in contact with or slightly spaced apart from each of the variator balls. In some embodiments, the second variator ball engagement surface is in driving engagement with each of the variator balls of the carrier assembly through one of a boundary layer type friction and an elastohydrodynamic film.

A ball ramp on each side of the variator provides the clamping force necessary to transfer the torque. Ball ramps, indicated in FIGS. 6, 7, 10, 13, 16, 19, 22, 25 and 28 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission (i.e. transfer of torque); however, it is understood that the amount of axial force necessary for proper operation may be generated by a clamping mechanism (not shown) or as a load applied during assembling of the variable transmission. Thus, as depicted in FIGS. 6, 7, 10, 13, 16, 19, 22, 25 and 28, a ball ramp on each side of the variator provides the clamping force necessary to transfer the torque in this embodiment.

Configuration 1—F13-36

Provided herein is a variable transmission 600 comprising: an input shaft 601; a first planetary gear set 660 comprising a carrier 663 drivingly engaged to the input shaft 601; the sun 662 gear drivingly engaged to a set of planet gears 664 which are engaged to a ring gear 661; the ring gear 661 is fixed to the casing of the first planetary gear set 660; a first ring assembly 671 of a variator 670 is drivingly engaged to the sun 662 of the first planetary gear set 660 said variator 670 comprising a first ring assembly 671 and a second ring assembly 672; said second ring assembly 672 is drivingly engaged to a sun gear 652 of a second planetary gear set 650; wherein the sun 652 of said second planetary gear set 650 is drivingly engaged to a set of planet gears 654, the carrier 653 of the second planetary gear set 650 is coupled to the input shaft 601; the set of planet gears 654 of the second planetary gear set 650 are drivingly engaged to the ring gear 651 of the second planetary gear set 650; and said ring gear 651 is mechanically coupled to a differential 680.

Figure 4:
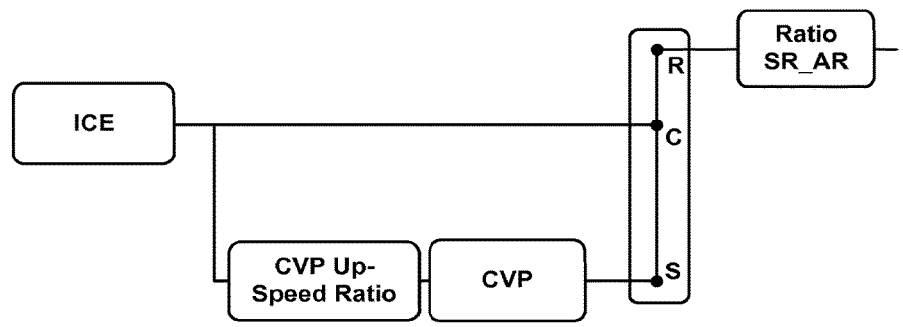
FIG. 4 is an illustrative example of an exemplary stick diagram powerpath based on an input coupling planetary (R, C, S, for Ring, Carrier and Sun) that combines input from the ICE and from the CVP into a symmetrical output. The CVP is connected to the sun of the planetary on one side and to the ICE through an up-speed ratio on the other side.

This configuration, as illustrated in FIG. 4, is based on an input coupling planetary gear set (R, C, S; for Ring, Carrier and Sun) that combines input from the ICE and from the CVP into a symmetrical output. The CVP is connected to the sun of the planetary on one side and to the ICE through an up-speed ratio on the other side. This up-speed ratio tends to increase the speeds and decrease the torque acting on the CVP, allowing decreasing the variator size.

The central part of that configuration is the variator described previously. A ball ramp on each side of the variator provides the clamping force necessary to transfer the torque. Due to the planetary, the configuration uses only a CVP and is able to provide standstill and reverse function as an IVP. No starting device like a slipping clutch or torque converter is required, since the IVP capability provides the starting function. However, these devices might be added to allow a safety disconnect or to start the engine. The ratio after the planetary is there to ensure that the maximum speeds and torques of the vehicle are still achieved.

Figure 5:
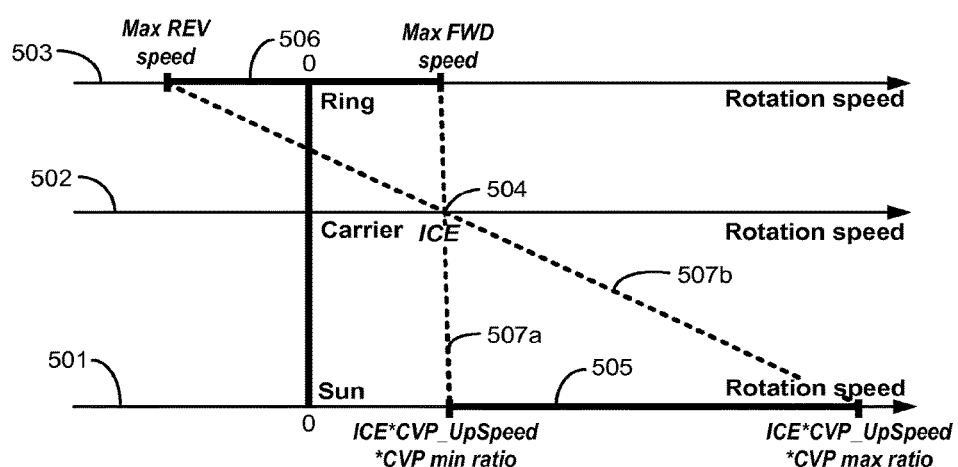
FIG. 5 is a graph of a speed diagram of the planetary gear set of the CVT of FIG. 4.

The speed diagram of the planetary gearset of this first configuration is illustrated in FIG. 5. The three horizontal axes represent respectively, from the bottom to the top, the sun rotation speed 501, the carrier rotation speed 502 and the ring rotation speed 503. The carrier is linked to the ICE and then always turns at the ICE speed, shown as a vertical bar 504 on the carrier axis. The sun is connected to the output of the CVP and is thus turning at a speed included between the ICE speed times the minimum ratio of the CVP times the up-speed ratio and the ICE speed times the maximum speed ratio of the CVP times the up-speed ratio. This speed interval 505 is shown as a bold line on the right side of the Sun axis.

The solid bold line interval 506 shown on the Ring axis is the speed achievable by the ring depending on the variator speed ratio. A minimum speed ratio in the variator brings the ring speed to its maximum forward speed while the maximum speed ratio in the CVP brings the ring speed to its maximum reverse speed. The dotted lines 507a, 507b show the limits achievable. It can be observed that the amount of positive speeds achievable with that configuration is the same, or similar to the reverse speeds.

This configuration is a power split configuration, meaning that there are multiple power paths that will be used at the same time. A part of the power will flow through the CVP, the planetary sun, planet and going out through the ring while a certain amount of the power will directly flow through the carrier, planets and ring of the planetary. In addition to that, the closed loop present in the configuration will allow some power to be recirculated, degrading the efficiency for certain ratios (ratios giving negative speeds on the ring).

Figure 6:
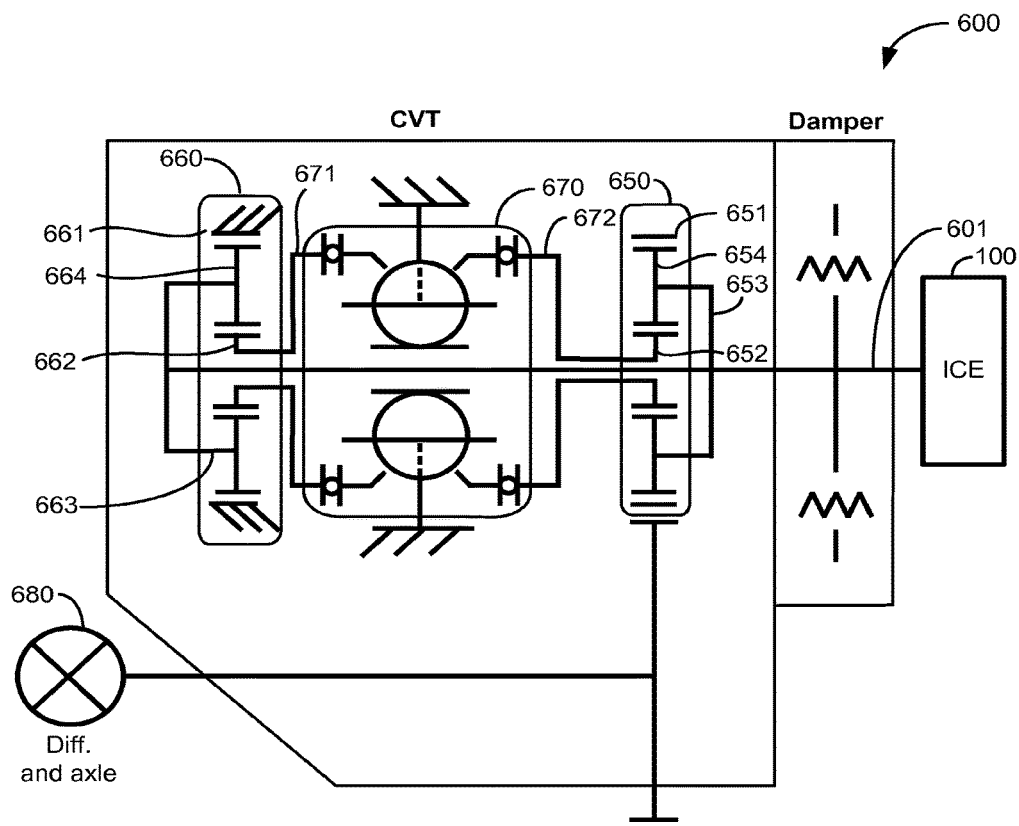
FIG. 6 is a block diagram of a continuously variable transmission (CVT) according to one embodiment of FIG. 4 used in a vehicle having an infinitely variable mode.

FIG. 6 shows a first layout for this configuration (Configuration 1, Layout 1). The view is taken from the side of the vehicle. The input 601 is linked to an up-speed planetary 660 used to increase the speed at the entrance of the CVP 670. To do so, the input is connected to the carrier 663 of the planetary 660, the ring 661 of the planetary 660 is fixed to the ground (casing) and the input of the CVP 672 is linked to the sun 662 of the planetary 660. The output of the CVP 670 is then coupled with the ICE 100 through the coupling planetary 650. The CVP is linked to the sun 652 of the coupling planetary and the ICE 100 is linked to the planets 654 and carrier 653. The output is made through the ring 651 of the coupling planetary 650.

Provided herein is a variable transmission 700 comprising: an input shaft 701; an up-speed ratio gear set 760 comprising a first gear 764 drivingly engaged to the input shaft 701; said gear set 760 comprising the first gear 764, a countershaft 761, a second gear 762 a third gear 763 and a fourth gear 765; said first gear is drivingly engaged to said second gear 762, wherein said second gear is drivingly engaged to said third gear 763 through the countershaft and the third 763 is drivingly engaged to the fourth gear 765; a first ring assembly 771 of a variator 770 is drivingly engaged to said fourth gear 765; said variator 770 comprising the first ring assembly 771 and a second ring assembly 772; said second ring assembly 772 is drivingly engaged to a sun gear 752 of a planetary gear set 750, wherein the sun 752 of said planetary gear set 750 is drivingly engaged to a set of planet gears 754; the carrier 753 of the planetary gear set 750 is coupled to the input shaft 701; the set of planet gears 754 of the second planetary gear set 750 are driving engaged to the ring gear 751 of planetary gear set 750; and said ring gear 751 is mechanically coupled to a differential 780.

Figure 7:
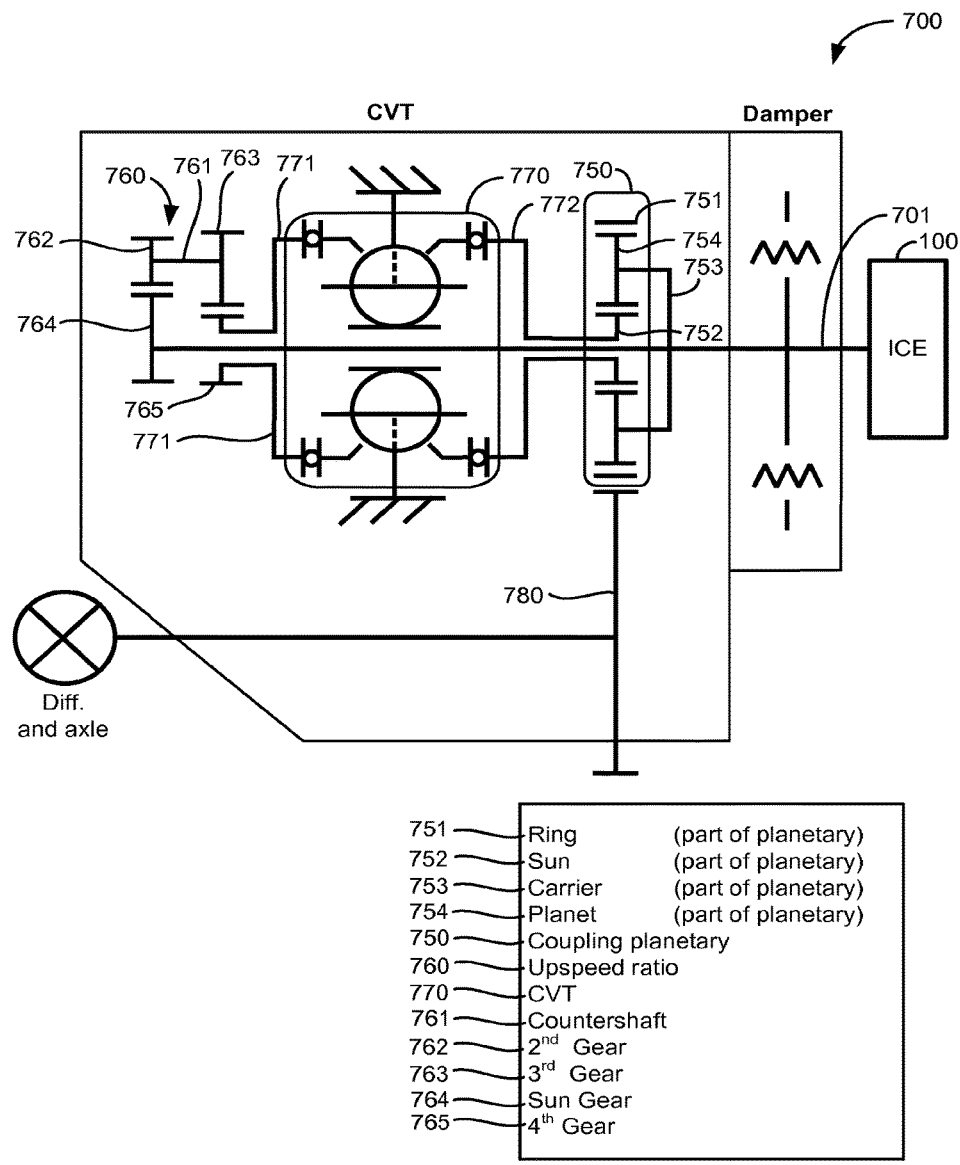
FIG. 7 is a block diagram of a continuously variable transmission (CVT) according to another embodiment of FIG. 4 used in a vehicle having an infinitely variable mode.

FIG. 7 shows a second transmission layout 700 for this configuration (Configuration 1, Layout 2). The view is taken from the side of the vehicle. The input 701 is linked to an up-speed gear set 760 used to increase the speed at the entrance 771 of the CVP 770. The up-speed gear set 760 is composed of a countershaft 761 and four gears 762, 763, 764 and 765 in order to gear the same sense of rotation. The output 772 of the CVP 770 is then coupled with the ICE 100 through the coupling planetary 750. The CVP 770 is linked to the sun 752 of the coupling planetary and the ICE 100 is linked to the planets 754 and carrier 753. The output 780 is made through the ring of the coupling planetary 751.

In some embodiments of the variable transmission, the sun gear turns within a speed range between a speed of the input shaft multiplied by a minimum speed ratio of the variator, multiplied by an up-speed ratio of the gear set and the speed of the input shaft multiplied by a maximum speed of the variator multiplied by the up-speed ratio of the gear set.

These two physical implementations are only examples, and this disclosure should not be restricted only to these examples. One skilled in the art would see that variants of this layout might be used to achieve the same speed diagram while keeping the same working principle.

Configuration 2

Provided herein is a variable transmission 1000 comprising: an input shaft 1001; a first gear set 1040 comprising a first gear 1041, second gear 1042 and a countershaft 1063, said first gear 1041 drivingly engaged to the input shaft 1001; said first gear is drivingly engaged to said second gear 1042, wherein said second gear 1042 is drivingly engaged to said countershaft 1063; a first ring assembly 1061 of a variator 1060 is drivingly engaged to said countershaft 1063; said variator 1060 comprising a first ring assembly 1061 and a second ring assembly 1062, wherein said variator is disposed on said countershaft 1063; said second ring assembly 1062 is drivingly engaged to a third gear 1071 of a second gear set 1070; said second gear set 1070 comprising the third gear 1071 that is drivingly engaged to a fourth gear 1073 on an output shaft 1072; said output shaft 1072 is drivingly engaged to sun 1052 of a planetary gear set 1050; wherein the sun 1052 of said planetary gear set 1050 is drivingly engaged to a set of planet gears 1054; the carrier 1053 of the planetary gear set 1050 is coupled to the input shaft 1001; the set of planet gears 1054 of the second planetary gear set 1050 are driving engaged to the ring gear 1051 of the planetary gear set 1050; and said ring gear 1051 is mechanically coupled to a differential 1080.

Figure 8:
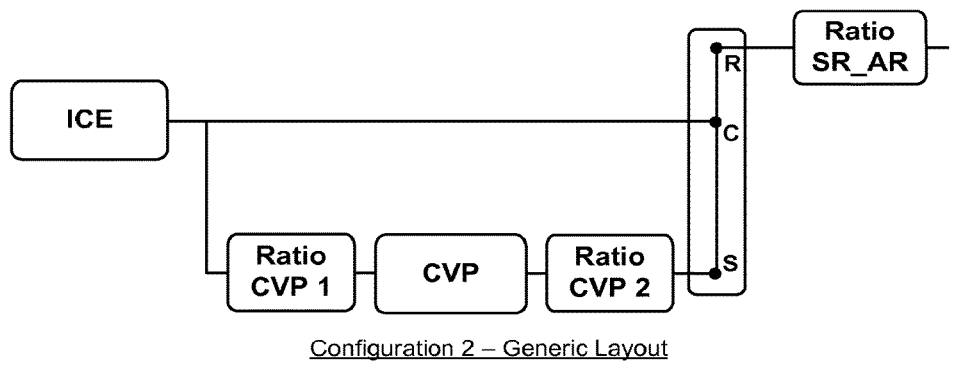
FIG. 8 is an illustrative example of an exemplary stick diagram powerpath based on an input coupling planetary (R, C, S, for Ring, Carrier and Sun) that combines input from the ICE and from the CVP into a symmetrical output. The CVP is connected to the sun of the planetary through a gear ratio on one side and to the ICE through an up-speed ratio on the other side.

This configuration, as illustrated in FIG. 8, is based on an input coupling planetary gear set (R, C, S; for Ring, Carrier and Sun) that combines input from the ICE and from the CVP into a symmetrical output. The CVP is connected to the sun of the planetary through a gear ratio on one side and to the ICE through an up-speed ratio on the other side. This up-speed ratio tends to increase the speeds and decrease the torque acting on the CVP, allowing decreasing the variator size.

The central part of that configuration is the variator described previously. A ball ramp on each side of the variator provides the clamping force necessary to transfer the torque. Due to the planetary, the configuration uses only a CVP and is able to provide standstill and reverse function as an IVP. No starting device like a slipping clutch or torque converter is required, since the IVP capability takes care of the starting function. However, these devices might be added to allow a safety disconnect or to start the engine.

Figure 9:
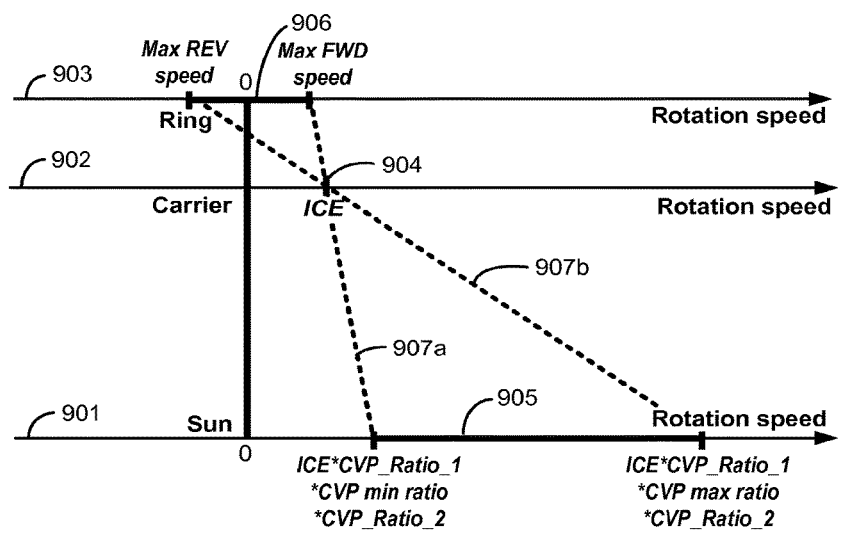
FIG. 9 is a graph of a speed diagram of the planetary gear set of FIG. 8.

The speed diagram of the planetary gearset of this second configuration is illustrated in FIG. 9. The three horizontal axes represent respectively, from the bottom to the top, the sun rotation speed 901, the carrier rotation speed 902 and the ring rotation speed 903. The carrier is linked to the ICE and then always turns at the ICE speed, shown as a solid bar 904 on the carrier axis. The sun is connected to the output of the CVP and is thus turning at a speed included between the ICE speed times the minimum ratio of the CVP times the two ratios and the ICE speed times the maximum speed ratio of the CVP times the two ratios. This speed interval 905 is shown as the solid line on the right side of the Sun axis.

The solid line interval 906 on the Ring axis shows the speed range achievable by the ring depending on the variator speed ratio. A minimum speed ratio in the variator brings the ring speed to its maximum forward speed while the maximum speed ratio in the CVP brings the ring speed to its maximum reverse speed. The dotted lines 907a, 907b show the limits achievable. It can be observed that the amount of positive speeds achievable with that configuration is the same, or similar to the reverse speeds.

This configuration is a power split configuration, meaning that there are multiple power paths that will be used at the same time. A part of the power will flow through the CVP, the planetary sun, planet and going out through the ring while a certain amount of the power will directly flow through the carrier, planets and ring of the planetary. In addition to that, the closed loop present in the configuration will allow some power to recirculated, degrading the efficiency for certain ratios (ratios giving negative speeds on the ring).

Figure 10:
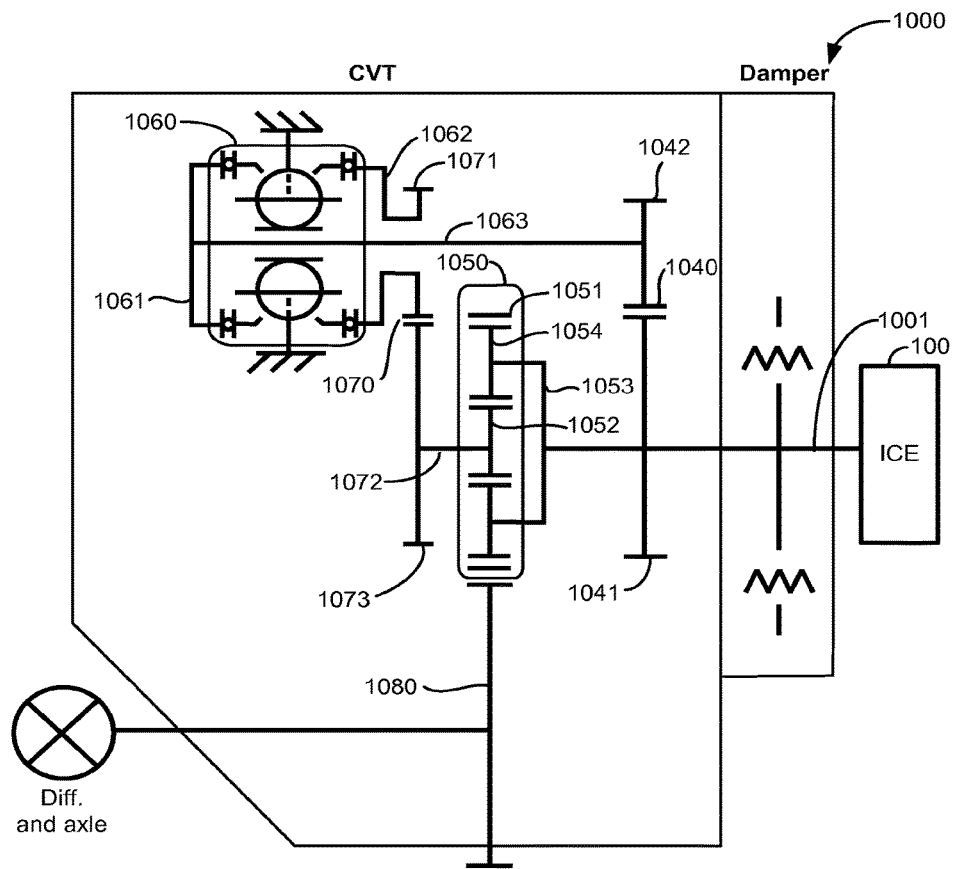
FIG. 10 is a block diagram of a continuously variable transmission (CVT) according to one embodiment of FIG. 8 used in a vehicle having an infinitely variable mode.

FIG. 10 shows a layout for this configuration (Configuration 2, Layout 1). The view is taken from the side of the vehicle. The input shaft 1001 is linked to an up-speed gear set 1040 comprising gears 1041, 1042, used to increase the speed at the entrance 1061 of the CVP 1060 to reduce the torque. The CVP 1060 is placed on a second axle 1063 thanks to this gear ratio 1040. The gear ratio 1040 makes the CVP 1060 turn in the opposite direction than the ICE 100. The output 1062 of CVP 1060 is drivingly connected to a second gear ratio 1070 comprising gears 1071 and 1072. The second ratio 1070 before the entry into the coupling planetary 1050 brings it back to a correct direction. The output of the CVP 1062 is then coupled with the ICE 100 through the coupling planetary 1050. The CVP 1060 is linked to the sun 1052 and planets 1054 of the coupling planetary 1050 and the ICE 100 is linked to the carrier 1053. The output 1080 is made through the ring 1051 of the planetary 1050.

This physical implementation is only an example, and this disclosure should not be restricted only to this example. One skilled in the art would see that variants of this layout might be used to achieve the same speed diagram while keeping the same working principle.

Configuration 3

Provided herein is a variable transmission 1300 comprising: an input shaft 1301 comprising a first gear 1311 and a second gear 1332 coupled thereto; said first gear 1311 is drivingly engaged to a third gear 1312 on a second shaft 1313; a first ring assembly 1361 of a variator 1360 is drivingly engaged to said first gear set 1310 comprising the third gear 1312; said variator comprising a first ring assembly 1361 and a second ring assembly 1362, wherein said variator is disposed on said second shaft 1313; said second ring assembly 1362 is drivingly engaged to a sun gear 1352 of a planetary gear set 1350, wherein the sun 1352 of said planetary gear set is drivingly engaged to a set of planet gears 1354; the carrier 1353 of the planetary gear set 1350 is coupled to a fourth gear 1331 of a second gear set 1330; said fourth gear 1331 is drivingly engaged to the second gear 1332 on the input shaft 1301; the set of planet gears 1354 of the planetary gear set are drivingly engaged to the ring gear 1351 of the planetary gear set; and said ring gear 1351 is mechanically coupled to the fifth gear 1321 on a third shaft 1320, wherein said third shaft comprises a fifth gear 1321 and a sixth gear 1322; and said sixth gear 1322 is mechanically linked to a differential 1380.

Figure 11:
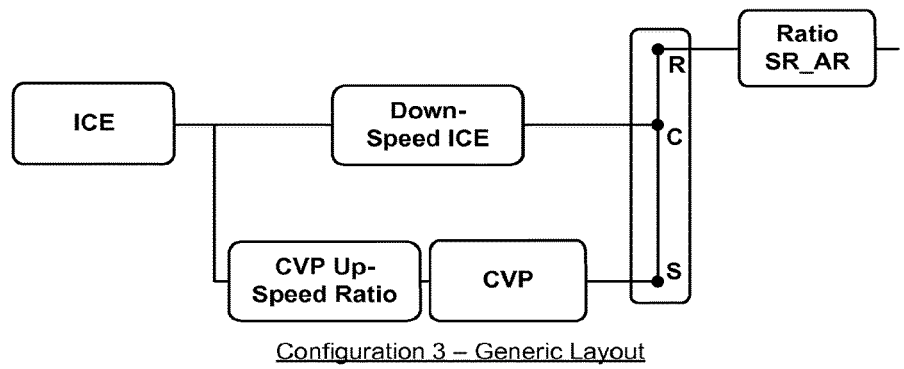
FIG. 11 is an illustrative example of an exemplary stick diagram powerpath based on an input coupling planetary (R, C, S, for Ring, Carrier and Sun) that combines input from the ICE through a down-speed ratio and from the CVP into a symmetrical output. The CVP is connected to the sun of the planetary on one side and to the ICE through an up-speed ratio on the other side.

This configuration, as illustrated in FIG. 11, is based on an input coupling planetary gear set (R, C, S; for Ring, Carrier and Sun) that combines input from the ICE and from the CVP into a symmetrical output. The CVP is connected to the sun of the planetary on one side and to the ICE through an up-speed ratio on the other side. This up-speed ratio tends to increase the speeds and decrease the torque acting on the CVP, allowing decreasing the variator size. The ICE is linked to the carrier of the planetary through a down-speed ratio.

The central part of that configuration is the variator described previously in the specification, and functions in the same way.

Figure 12:
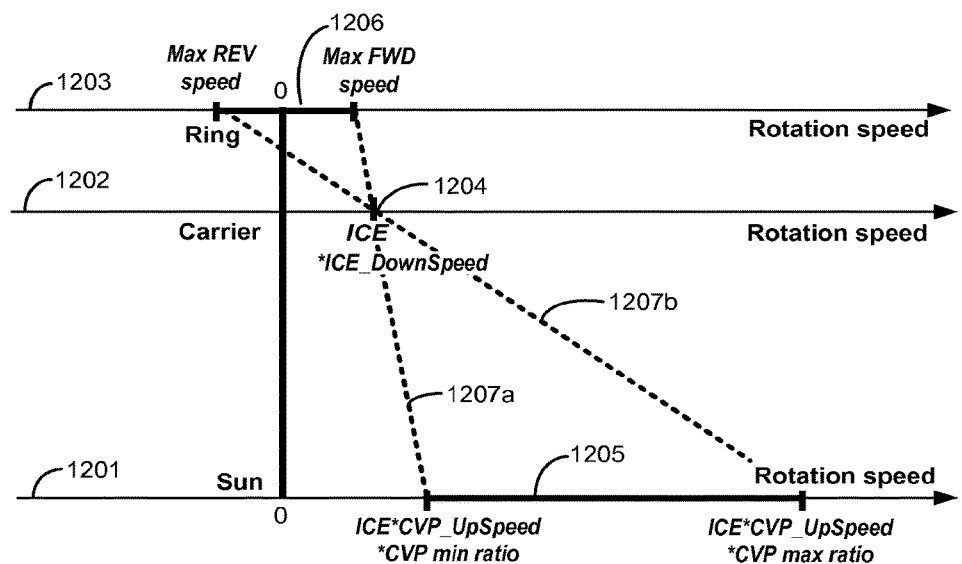
FIG. 12 is a graph of a speed diagram of the planetary gear set of the CVT of FIG. 11.

The speed diagram of the planetary gearset of this third configuration is illustrated in FIG. 12. The three horizontal axes represent respectively, from the bottom to the top, the sun rotation speed 1201, the carrier rotation speed 1202 and the ring rotation speed 1203. The carrier is linked to the ICE through the down-speed ratio and then always turns at the ICE speed times that ratio, shown as a solid bar 1204 on the carrier axis. The sun is connected to the output of the CVP and is thus turning at a speed included between the ICE speed times the minimum ratio of the CVP times the up-speed ratio and the ICE speed times the maximum speed ratio of the CVP times the up-speed ratio. This speed interval 1205 is shown as a bold line on the right side of the Sun axis.

The solid bold interval 1206 on the Ring axis shows the speed achievable by the ring depending on the variator speed ratio. A minimum speed ratio in the variator brings the ring speed to its maximum forward speed while the maximum speed ratio in the CVP brings the ring speed to its maximum reverse speed. The dotted lines 1207a, 1207b, show the limits achievable. It can be observed that the amount of positive speeds achievable with that configuration is the same, or similar to the reverse speeds.

This configuration is a power split configuration, meaning that there are multiple power paths that will be used at the same time. A part of the power will flow through the CVP, the planetary sun, planet and going out through the ring while a certain amount of the power will directly flow through the carrier, planets and ring of the planetary. In addition to that, the closed loop present in the configuration will allow some power to recirculated, degrading the efficiency for certain ratios (ratios giving negative speeds on the ring).

Figure 13:
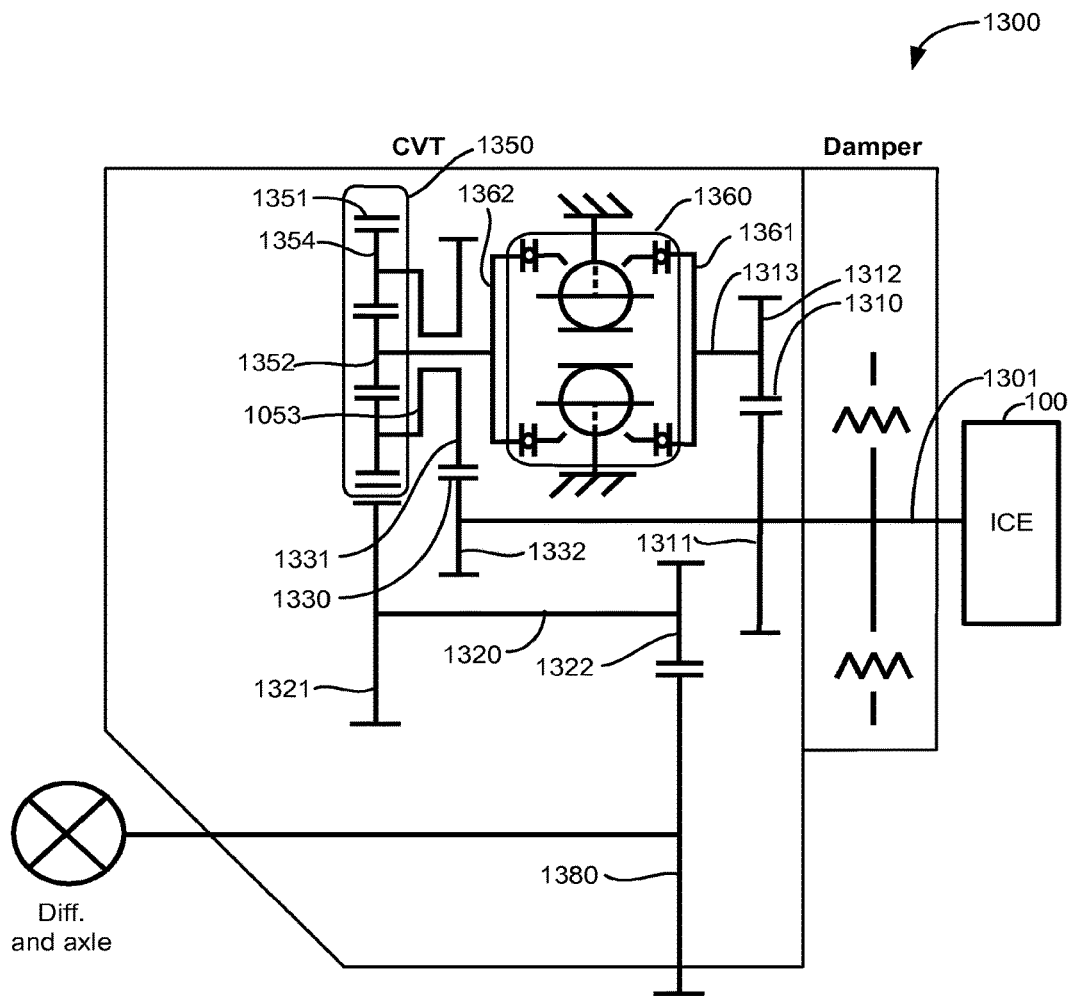
FIG. 13 is a block diagram of a continuously variable transmission (CVT) according to one embodiment of FIG. 11 used in a vehicle having an infinitely variable mode.

FIG. 13 shows a layout for this configuration (Configuration 3, Layout 1). The view is taken from the side of the vehicle. The input shaft 1301 is linked to an up-speed gear set 1310 comprising a first gear 1311 and a third gear 1312 used to increase the speed at the entrance 1361 of the CVP 1360 to reduce the torque. The CVP 1360 is placed on a second axle 1313 thanks to this gear ratio. The gear ratio 1310 makes the CVP 1360 turn in the opposite direction than the ICE 100. But the countershaft 1320 after the coupling planetary 1350 will bring it back to a correct direction. The output 1362 of the CVP 1360 is then coupled with the ICE 100 through the coupling planetary 1350. The CVP 1360 is linked to the sun 1352 and the planets 1354 of the coupling planetary 1350 and the ICE 100 is linked to the carrier 1353 through a down-speed ratio 1330 comprising a fourth gear 1331 and a second gear 1332. The output 1380 is made through the ring 1351 of the coupling planetary 1350 through the countershaft 1320 comprising a fifth gear 1321 and a sixth gear 1322.

This physical implementation is only an example, and this disclosure should not be restricted only to this example. One skilled in the art would see that variants of this layout might be used to achieve the same speed diagram while keeping the same working principle.

Configuration 4

Provided herein is a variable transmission 1600 comprising: an input shaft 1601 comprising a first gear 1605; a first planetary gear set 1680 comprising a first carrier 1683 drivingly engaged to the input shaft 1601; the carrier 1683 drivingly engaged to a set of planet gears 1684 which are engaged to a sun gear 1682; the ring gear 1681 is fixed to the casing of the first planetary gear set 1680; a first ring assembly 1661 of a variator 1660 is drivingly engaged to the sun 1682 of the first planetary gear set 1680; said variator comprising the first ring assembly 1661 and a second ring assembly 1662; said second ring assembly 1662 is drivingly engaged to a first sun gear 1614 of a second planetary gear set 1610, wherein said second planetary gear set 1610 is a compound planetary gear set; wherein the first sun 1614 of said second planetary gear set 1610 is drivingly engaged to two sets of shared planet gears 1611 and 1612; said shared planet gears 1611 and 1612 are drivingly engaged to a shared carrier 1613; said shared carrier 1613 of the second planetary gear set 1613 is drivingly engaged to fourth gear 1673 which is drivingly engaged to a second gear 1671 coupled to a counter shaft 1670; said countershaft comprising said second gear 1671 and a third gear 1672; said third gear 1672 is drivingly coupled to the first gear 1605 on the input shaft 1601; the set of shared planet gears 1612 of the second planetary gear set 1610 are drivingly engaged to a second sun gear 1615 of the second planetary gear set; and said second sun gear 1615 is mechanically coupled to output gear 1616 which is drivingly engaged to a differential 1690.

Figure 14:
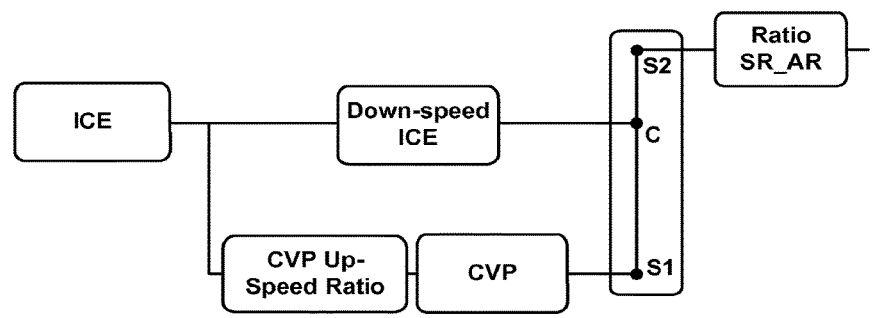
FIG. 14 is an illustrative example of an exemplary stick diagram powerpath based on a coupling compound planetary (S1, C, S2, for the first Sun, the Carrier and the second Sun) that combines input from the ICE and from the CVP into a symmetrical output.

This configuration, as illustrated in FIG. 14, is based on a coupling compound planetary (S1, C, S2, for the first Sun, the Carrier and the second Sun) that combines input from the ICE and from the CVP into a symmetrical output. The CVP is connected to the sun of the planetary on one side and to the ICE through an up-speed ratio on the other side. This up-speed ratio tends to increase the speeds and decrease the torque acting on the CVP, allowing decreasing the variator size. The ICE is linked to the carrier of the planetary through a down-speed ratio.

The central part of that configuration is the variator described previously in the specification, and functions in the same way.

Figure 15:
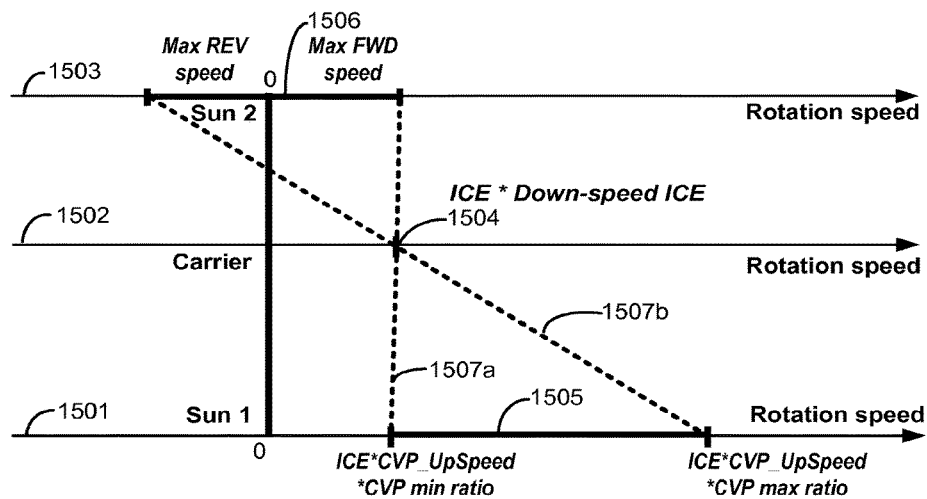
FIG. 15 is a graph of a speed diagram of the planetary gear set of the CVT of FIG. 14.

The speed diagram of the planetary gearset of this fourth configuration is illustrated in FIG. 15. The three horizontal axes represent respectively, from the bottom to the top, the sun rotation speed 1501, the carrier rotation speed 1502 and the ring rotation speed 1503. The carrier is linked to the ICE through the down-speed ratio and then always turns at the ICE speed times that ratio, shown as a solid bar 1504 on the carrier axis. The sun is connected to the output of the CVP and is thus turning at a speed included between the ICE speed times the minimum ratio of the CVP times the up-speed ratio and the ICE speed times the maximum speed ratio of the CVP times the up-speed ratio. This speed interval is shown as a solid bold section 1505 on the right side of the Sun axis.

The solid interval 1506 on the Ring axis shows the speed achievable by the ring depending on the variator speed ratio. A minimum speed ratio in the variator brings the ring speed to its maximum forward speed while the maximum speed ratio in the CVP brings the ring speed to its maximum reverse speed. The dotted lines 1507a, 1507b show the limits achievable. It can be observed that the amount of positive speeds achievable with that configuration is the same, or similar to the reverse speeds.

This configuration is a power split configuration, meaning that there are multiple power paths that will be used at the same time. A part of the power will flow through the CVP, the planetary sun, planet and going out through the ring while a certain amount of the power will directly flow through the carrier, planets and ring of the planetary. In addition to that, the closed loop present in the configuration will allow some power to recirculated, degrading the efficiency for certain ratios (ratios giving negative speeds on the ring).

Figure 16:
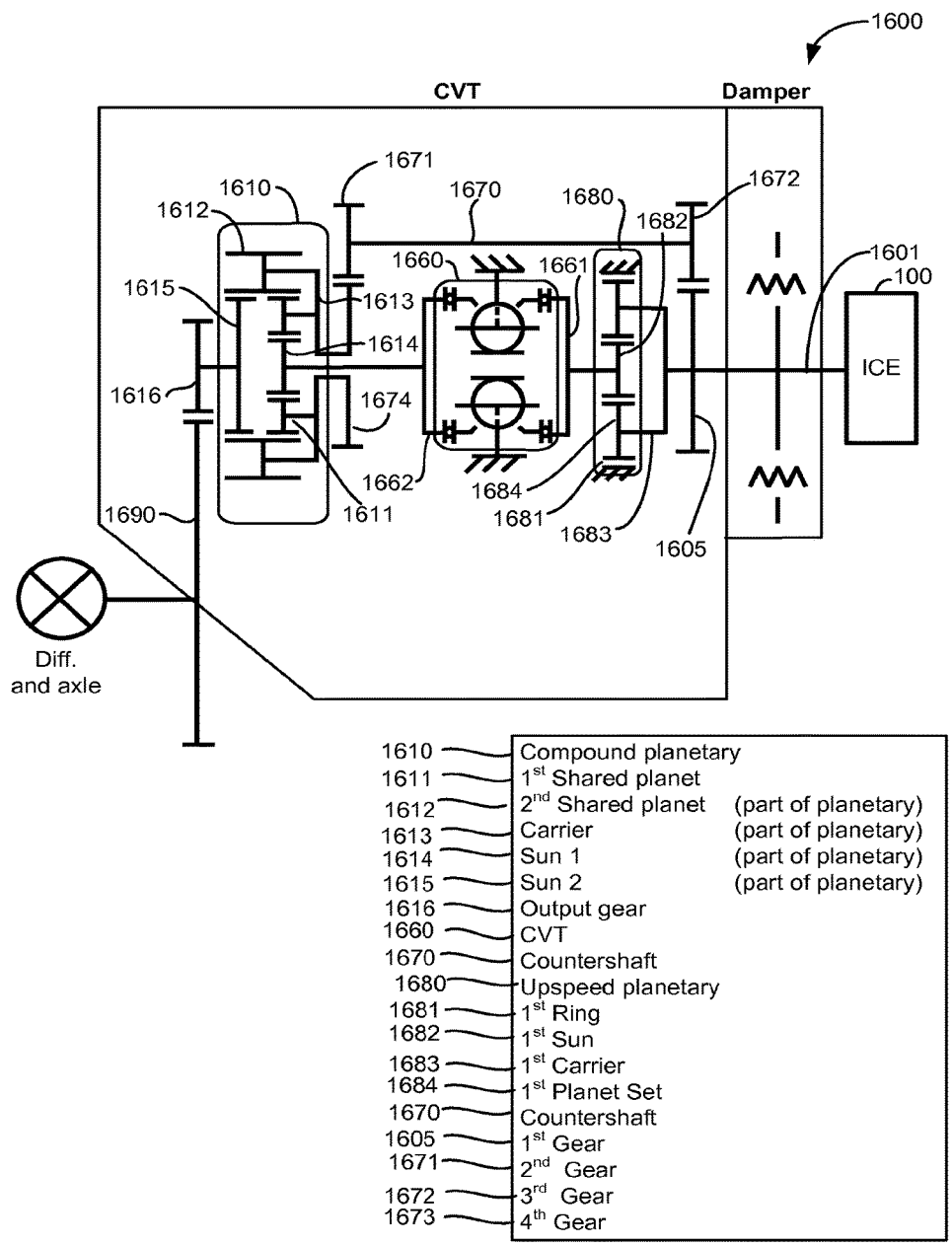
FIG. 16 is a block diagram of a continuously variable transmission (CVT) according to one embodiment of FIG. 14 used in a vehicle having an infinitely variable mode.

FIG. 16 shows a layout for this configuration (Configuration 4, Layout 1). The view is taken from the side of the vehicle. The input shaft 1601 is linked to an up-speed planetary gear set 1680 used to increase the speed at the entrance of the CVP 1660 to reduce the torque. The output of the CVP 1660 is then coupled with the ICE 100 through the coupling compound planetary 1610. The ICE speed is applied on the carrier 1613 of the compound planetary gearset 1610 through the countershaft 1670. The CVP output is linked to the first sun 1614 of the compound planetary. A set of shared planet 1612 links together the two planes of gears of the compound planetary. The second sun 1615 is linked to the output 1690 of the transmission.

A compound planetary is used to create ratios that cannot be created in a normal planetary, but other arrangements of planetary gear sets might also be used as long as they provide the same functionalities as shown on the speed diagram.

Configuration 5, Layout 1—F13-39 Config. 1

Figure 19:
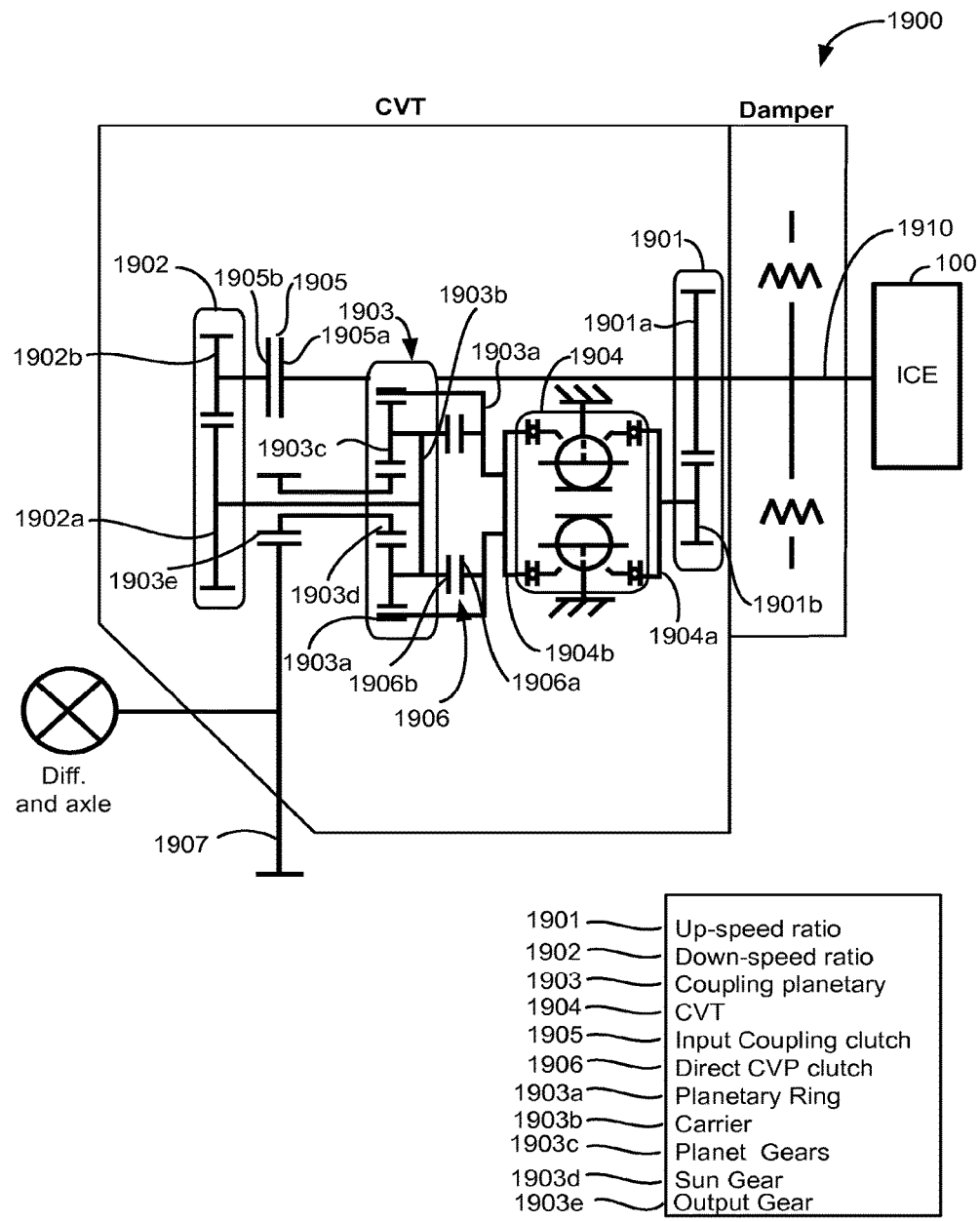
FIG. 19 is a block diagram of a continuously variable transmission (CVT) according to one embodiment of FIG. 17 used in a vehicle having an infinitely variable mode.

Provided herein is a variable transmission 1900 as illustrated in FIG. 19, comprising: an input shaft 1910 comprising a first gear 1901a of a first gear set 1901 and coupled to a first portion 1905a of a first clutch 1905: the first gear set comprising the first gear 1901a and a second gear 1901b; a variator 1904 comprising a first ring assembly 1904a drivingly engaged to the second gear 1901b, and a second ring assembly 1904b coupled to a ring gear 1903a of a planetary gear set 1903 and coupled to a first portion 1906a of a second clutch 1906; the planetary gear set 1903 comprising the ring gear 1903a, a carrier 1903b coupled to a second portion 1906b of the second clutch 1906; a set of planet gears 1903c drivingly engaged to the carrier 1903b; and a sun gear 1903d drivingly engaged with the set of planet gears 1903c, wherein said planetary gear set 1903 is a coupling planetary gear set; and a second gear set 1902 comprising a third gear 1902a drivingly engaged to the carrier 1903b, and a fourth gear 1902b coupled to a second portion 1905b of the first clutch 1905, and the sun gear 1903d is mechanically coupled to an output gear 1903e which is drivingly engaged to a differential 1907.

Figure 17:
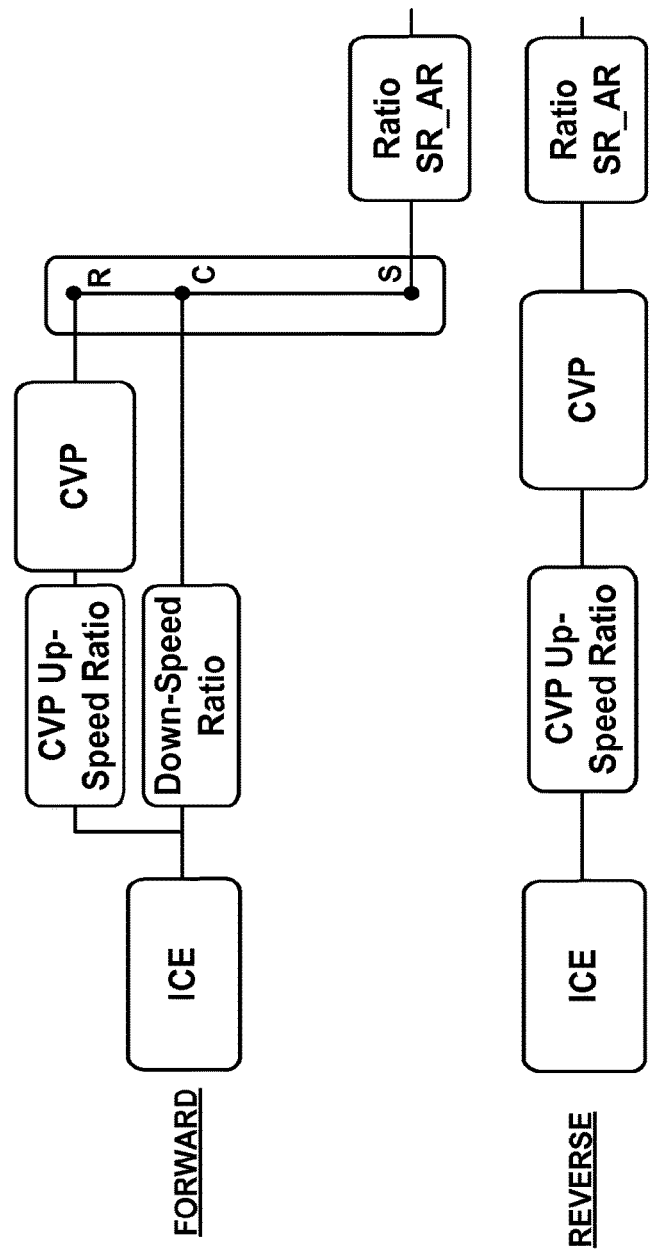
FIG. 17 is an illustrative example of an exemplary stick diagram powerpath based on a dual mode solution, each mode being selected by closing a clutch/brake and releasing the other.

This configuration, as illustrated in FIG. 17, is based on a dual mode solution, each mode being selected by closing a clutch/brake and releasing the other. The reverse mode is a direct CVP mode, active by locking the planetary with a clutch incorporated in it. The forward mode (also providing low reverse speeds) is composed of an input coupling planetary gear set (R, C, S; for Ring, Carrier and Sun) that combines input from the ICE and from the CVP into an IVT output. The CVP is connected to the ring of the planetary on one side and to the ICE through an up-speed ratio on the other side. This up-speed ratio tends to increase the speeds and decrease the torque acting on the CVP, allowing a decrease in the variator size. The ICE is also connected to the carrier through a down-speed ratio in the forward mode. It has to be noted that the naming of the modes as Forward and Reverse is arbitrarily made, in this case, the forward mode also provides low reverse speeds as well as a powered neutral. However, as this mode covers the whole forward speed range it has been named Forward.

The central part of that configuration is the variator described previously in the document. A ball ramp on each side of the variator provides the clamping force necessary to transfer the torque. Thanks to the planetary, the configuration uses only a CVP and is able to provide standstill and reverse function as an IVP. No starting device like a slipping clutch or torque converter is required, since the IVP capability takes care of the starting function. However, these devices might be added to allow a safety disconnect or to start the engine. Ratio after the planetary is there to ensure that the maximum speeds and torques of the vehicle are still achieved.

Figure 18:
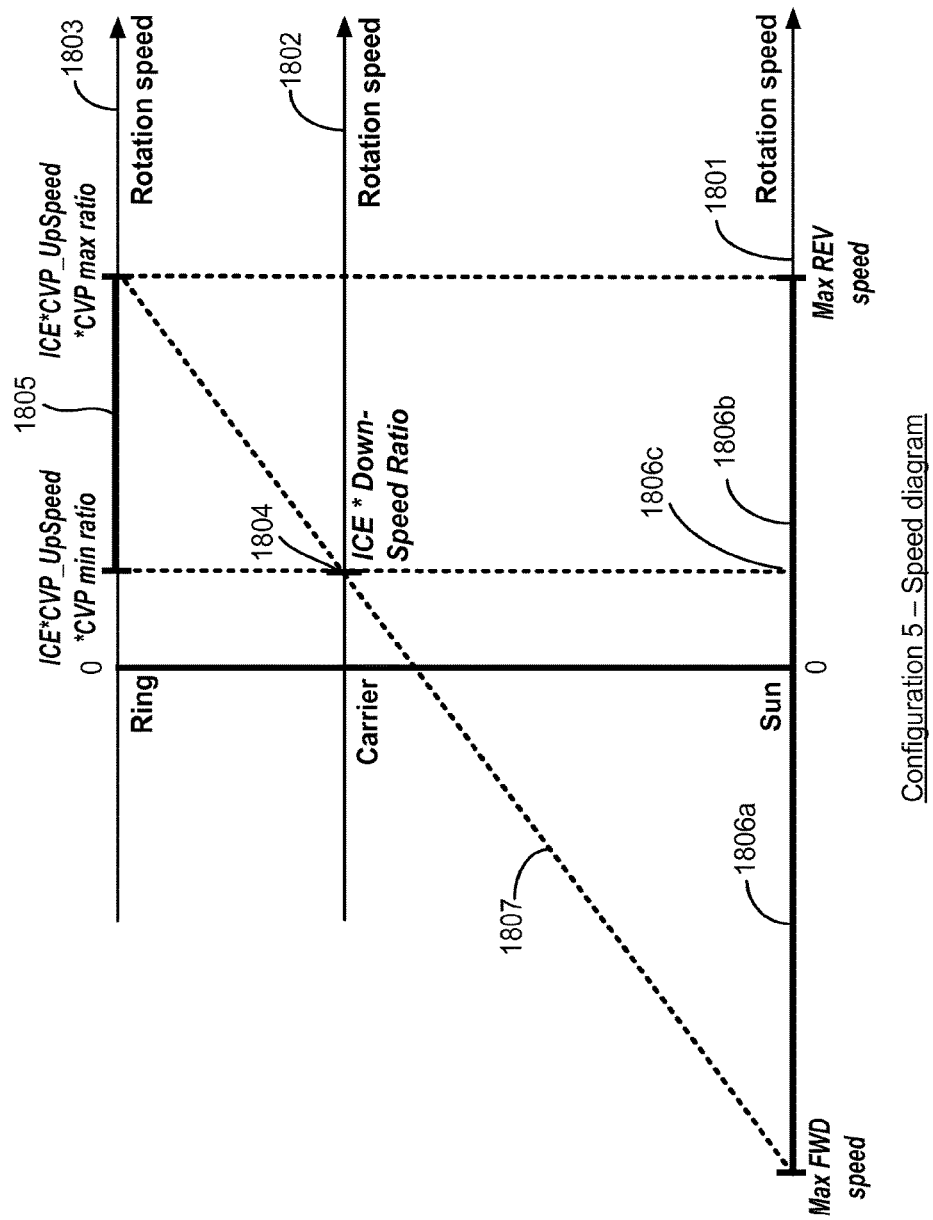
FIG. 18 is a graph of a speed diagram of the planetary gear set of the CVT of FIG. 17.

The speed diagram of the planetary gearset of this fifth configuration is illustrated in FIG. 18. The three horizontal axes represent respectively, from the bottom to the top, the sun rotation speed 1801, the carrier rotation speed 1802 and the ring rotation speed 1803. In the forward mode, the carrier is linked to the ICE through a down speed ratio and then turns at the ICE speed times this down speed ratio, shown as a solid intersection (blue) bar 1804 on the carrier axis. The ring is connected to the output of the CVP and is thus turning at a speed included between the ICE speed times the minimum ratio of the CVP times the up-speed ratio (ICE*CVP_UpSpeed*CVP min ratio) and the ICE speed times the maximum speed ratio of the CVP times the up-speed ratio (ICE*CVP_UpSpeed*CVP max ratio). This speed interval 1805 is shown (in red) on the ring axis.

In the forward mode, the green interval 1806a (on the bottom left) shows the speed achievable by the sun depending on the variator speed ratio. A minimum speed ratio in the variator brings the sun speed to its maximum reverse speed 1806c (in this mode) while the maximum speed ratio in the CVP brings the sun speed to its maximum reverse speed. The green dotted (diagonal) line 1807 shows the limits achievable.

This mode is a power split mode, meaning that there are multiple power paths that will be used at the same time. A part of the power will flow through the CVP, the planetary ring, planet and going out through the sun while a certain amount of the power will directly flow through the carrier, planets and sun of the planetary.

In the reverse mode, the carrier is decoupled from the ICE, by opening a clutch, and the planetary is locked in a 1 to 1 ratio. The speeds achieved at the CVP output, on the ring of the planetary are thus also the speeds achieved by the carrier and the sun. The output range is shown in orange on the sun axis. The design is made so that the maximum reverse speed of the forward mode corresponds to the minimum speed of the reverse mode, allowing synchronous shifts. However, a slight change in the gear ratios might provide overlap between the two modes or even gap if this is needed for a specific reason.

As described previously, FIG. 19 shows a layout for this configuration (Configuration 5, Layout 1). The view is taken from the side of the vehicle. The input is always linked to an up-speed ratio 1 going to the CVP 1904 and to the first member of the input coupling clutch 1905 (to engage the "forward mode"). The CVP output is linked to the ring of the planetary 1903. A clutch 1906 allows coupling the carrier and the ring of the planetary 1903 to engage the direct reverse mode. This clutch 1906 has to engage two elements of the planetary to lock it in a 1:1 ratio; however, the choice of these two elements is not fixed and might be changed. The carrier of the planetary 1903 is linked to the down-speed ratio 1902 and might thus be connected to the ICE when the clutch 1905 is engaged. The sun of the planetary 1903 is connected to the output of the transmission.

Configuration 6, Layout 1—F13-39 Config. 2

Figure 22:
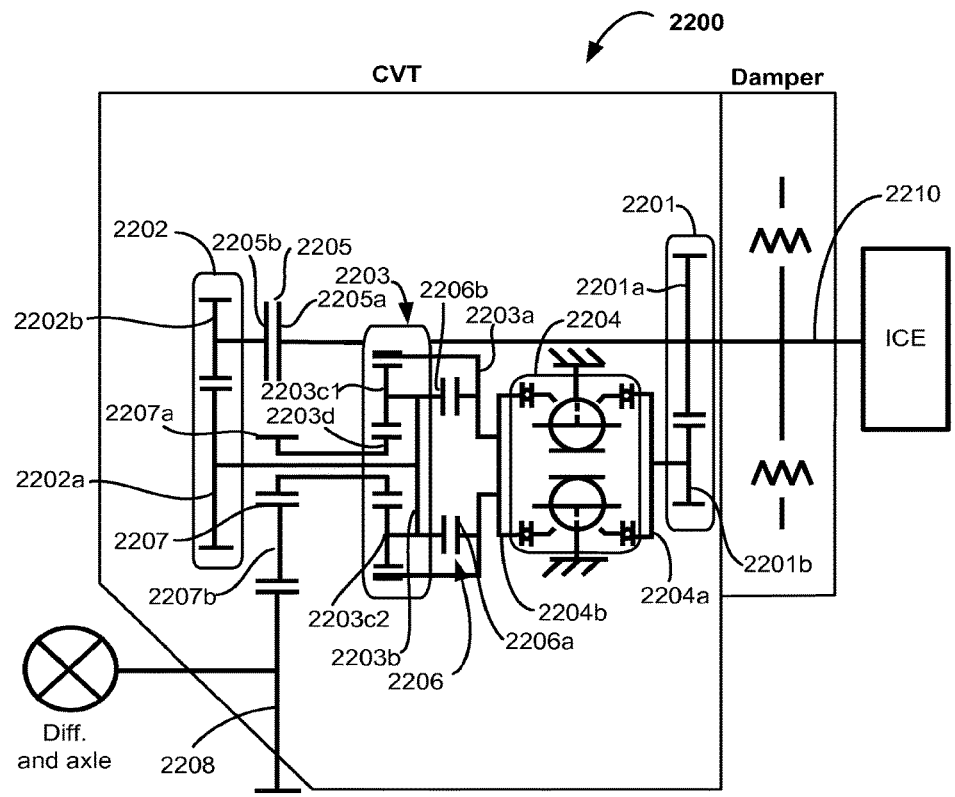
FIG. 22 is a block diagram of a continuously variable transmission (CVT) according to one embodiment of FIG. 20 used in a vehicle having an infinitely variable mode.

Provided herein is a variable transmission 2200 as illustrated in FIG. 22 comprising: an input shaft 2210 comprising a first gear 2201a of a first gear set 2201 and coupled to a first portion 2205a of a first clutch 2205; the first gear set comprising the first gear 2201a and a second gear 2201b; a variator 2204 comprising a first ring 2204a assembly drivingly engaged to the second gear 2201b, and a second ring assembly 2204b coupled to a ring gear 2203a of a planetary gear set 2203 and coupled to a second portion 2206a of a second clutch 2206; the planetary gear set 2203 comprising the ring gear 2203a, a carrier 2203b coupled to a third portion 2206b of the second clutch 2206; a set of planet gears 2203c1, 2203c2 drivingly engaged to the carrier 2203b; and a sun gear 2203d drivingly engaged with the set of planet gears 2203c1, 2203c2, wherein said planetary gear set 2203 is a coupling planetary gear set; and a second gear set 2202 comprising a third gear 2202a drivingly engaged to the carrier 2203b, and a fourth gear 2202b coupled to a fourth portion 2205b of the first clutch 2205, and the sun gear 2203d is mechanically coupled to a fifth gear 2207, of a third gear set 2207 comprising the fifth gear 2207a and a sixth gear 2207b wherein said fifth gear 2207a is drivingly engaged to the sixth gear 2207b which is mechanically coupled to a differential 2208.

Figure 20:
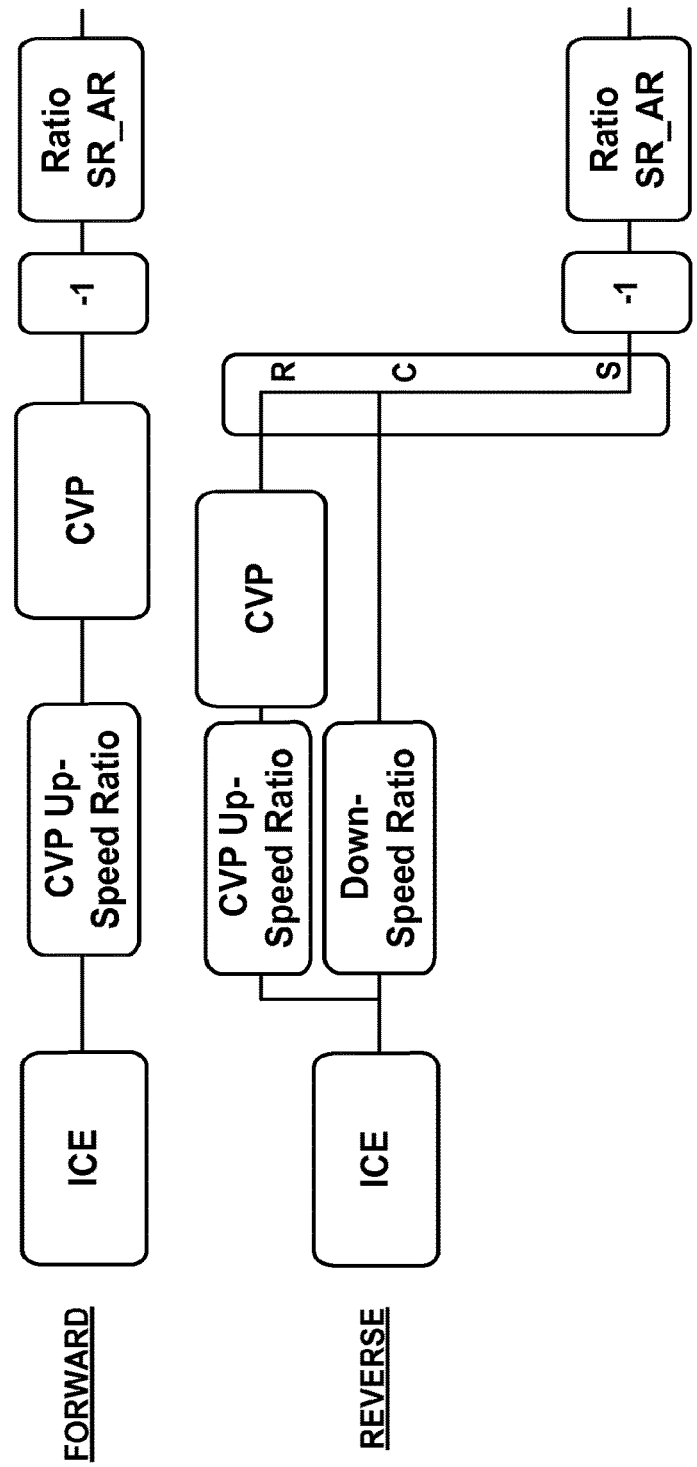
FIG. 20 is another illustrative example of an exemplary stick diagram powerpath based on a dual mode solution, each mode being selected by closing a clutch/brake and releasing the other.

This configuration, as illustrated in FIG. 20, is based on a dual mode solution, each mode being selected by closing a clutch/brake and releasing the other. The forward (direct) mode is a direct CVP mode, activated by locking the planetary with a clutch incorporated in it. The reverse mode, (also providing low forward speeds) is composed of an input coupling planetary gear set (R, C, S; for Ring, Carrier and Sun) that combines input from the ICE and from the CVP into an IVT output. The CVP is connected to the ring of the planetary on one side and to the ICE through an up-speed ratio on the other side. This up-speed ratio tends to increase the speeds and decrease the torque acting on the CVP, allowing decreasing the variator size. The ICE is also connected to the carrier through a down-speed ratio in the reverse mode. It has to be noted that the naming of the modes as Forward and Reverse is arbitrarily made, in this case, the reverse mode also provide low forward speeds as well as a powered neutral. However, as this mode covers the whole reverse speed range it has been named Reverse.

The central part of that configuration is the variator described previously in the specification, and functions in the same way.

Figure 21:
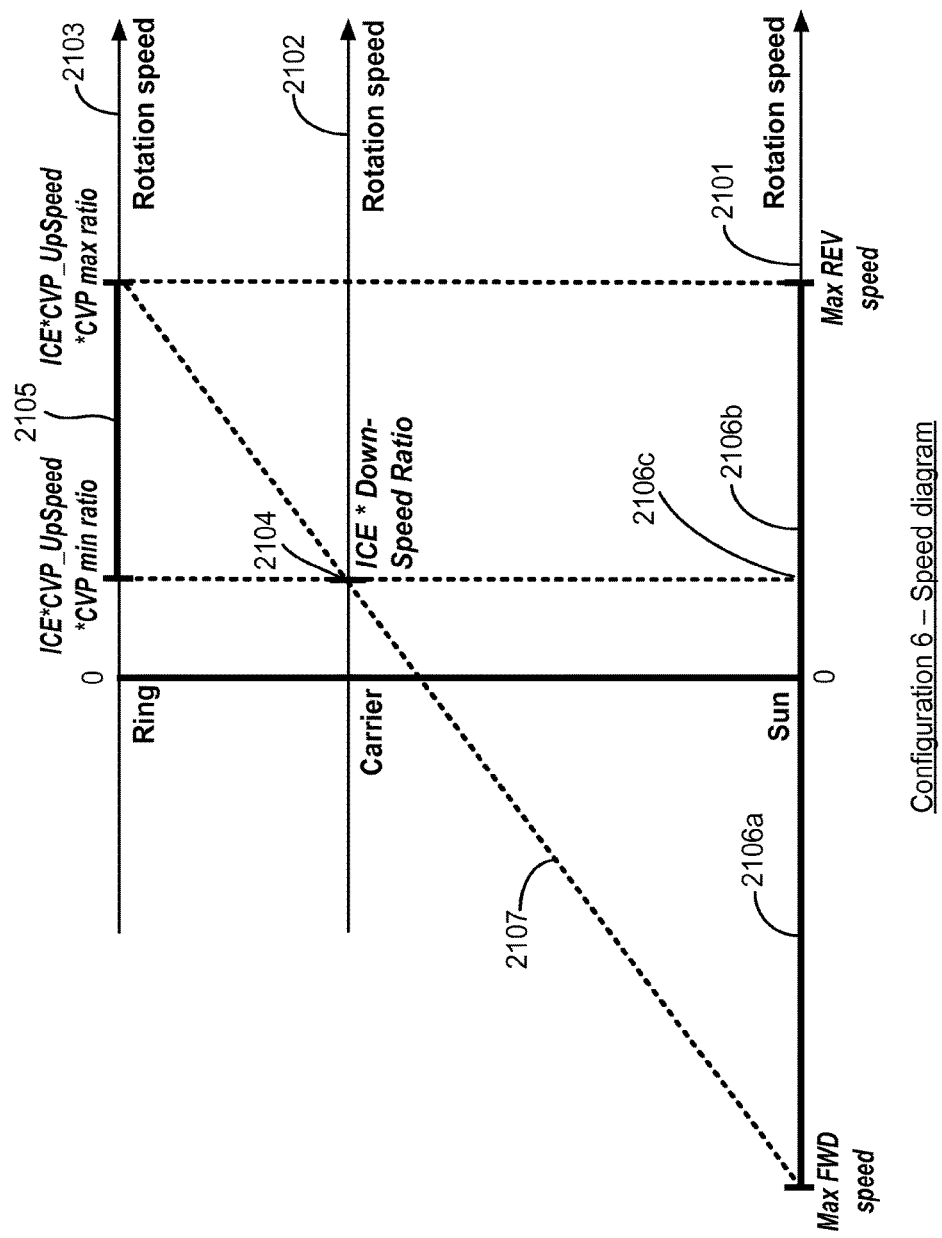
FIG. 21 is a graph of a speed diagram of the planetary gear set of the CVT of FIG. 20.

The speed diagram of the planetary gearset of this sixth configuration is illustrated in FIG. 21. The three horizontal axes represent respectively, from the bottom to the top, the sun rotation speed 2101, the carrier rotation speed 2102 and the ring rotation speed 2103.

In the reverse mode, the carrier is linked to the ICE through a down speed ratio and then turns at the ICE speed times this down speed ratio, shown as a solid (blue) bar 2104 on the carrier axis. The ring is connected to the output of the CVP and is thus turning at a speed included between the ICE speed times the minimum ratio of the CVP times the up-speed ratio (ICE*CVP_UpSpeed*CVP min ratio) and the ICE speed times the maximum speed ratio of the CVP times the up-speed ratio (ICE*CVP_UpSpeed*CVP max ratio). This speed interval 2105 is shown (in red) on the ring axis.

In the reverse mode, the solid (green) interval (on the left) 2106*a* shows the speed achievable by the sun, depending on the variator speed ratio. A minimum speed ratio in the variator brings the sun speed to its maximum forward speed (in this mode) while the maximum speed ratio in the CVP brings the sun speed range 2106*b* to its maximum reverse speed 2106*c*. The diagonal (green) dotted line 2107 shows the limits achievable. It has to be noted that reverse speeds are on the left, while forward speeds are on the right, this is due to the fact that a ratio −1 is incorporated in the configuration, after the planetary gear set. This −1 ratio might be added before it and the reverse mode would then be shown on the right.

This mode is a power split mode, meaning that there are multiple power paths that will be used at the same time. A part of the power will flow through the CVP, the planetary ring, planet and going out through the sun while a certain amount of the power will directly flow through the carrier, planets and sun of the planetary.

In the forward mode, the carrier is decoupled from the ICE, by opening a clutch, and the planetary is locked in a 1 to 1 ratio. The speeds achieved at the CVP output, on the ring of the planetary are thus also the speeds achieved by the carrier and the sun. The output range is shown in orange on the sun axis. The design is made so that the maximum forward speed of the reverse mode corresponds to the minimum speed of the forward mode, allowing synchronous shifts. However, a slight change in the gear ratios might provide overlap between the two modes or even gap if this is needed for a specific reason.

It might be noted that this configuration is the same as the previous one, at the exception of the −1 ratio. The choice of one or another configuration will depend on the application and the requirements. One will give better performance in one direction, or better efficiencies, the other configuration will provide the opposite.

FIG. 22 shows a layout for this configuration (Configuration 6, Layout 1). The view is taken from the side of the vehicle. The input is always linked to the up-speed ratio 2201 going to the CVP 2204 and to the first member of the input coupling clutch 2205 (to engage the "reverse mode"). The CVP output is linked to the ring of the planetary 2203. A clutch 2206 allows coupling the carrier and the ring of the planetary to engage the direct forward mode. This clutch 2206 has to engage two elements of the planetary to lock it in a 1:1 ratio; however, the choice of these two elements is not fixed and might be changed. The carrier of the planetary 2203 is linked to the down-speed ratio 2202 and might thus be connected to the ICE when the clutch 2205 is engaged. The sun of the planetary 2203 is connected to the output of the transmission through a −1 ratio 2207.

Configuration 7, Layout 1—F13-39 Config. 3

Figure 25:
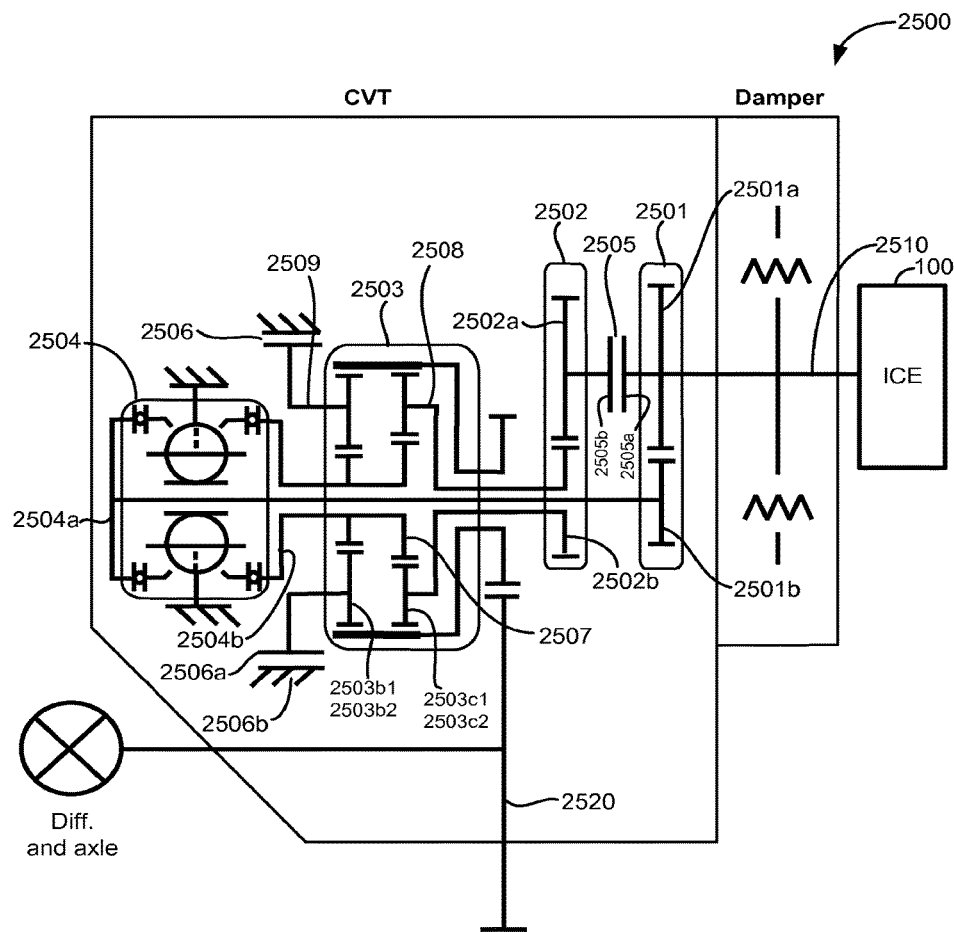
FIG. 25 is a block diagram of a continuously variable transmission (CVT) according to one embodiment of FIG. 23 used in a vehicle having an infinitely variable mode.

Provided herein is a variable transmission, as illustrated in FIG. 25, comprising: an input shaft 2510 comprising a first gear 2501*a* of a first gear set 2501 coupled to a first portion 2505*a* of a first clutch 2505 and a second gear 2502*a* of a second gear set 2502 coupled to a second portion 2505*b* of said first clutch 2505; the first clutch 2505 comprising a first portion 2505*a* and a second portion 2505*b*; the first gear set 2501 comprising the first gear 2501*a* and a third gear 2501*b*; the second gear set 2502 comprising the second gear 2502*a* and a fourth gear 2502*b*; a variator 2504 comprising a first ring assembly 2504*a* drivingly engaged to the third gear 2501*b*, and a second ring assembly 2504*b* coupled to a common sun gear 2507 of a compound planetary gear set 2503; the compound planetary gear set 2503 comprising the common sun 2507, a second set of planet gears 2503*b*1, 2503*b*2, coupled to a second carrier 2509, said second carrier 2509 coupled to a third portion 2506*a* of a second clutch 2506, wherein a fourth portion 2506*b* of said second clutch 2506 is fixed to ground; a first set of planet gears 2503*c*1, 2503*c*2, coupled to a first carrier 2508, wherein said first carrier 2508 is drivingly engaged to the fourth gear 2502*b* of said second gear set 2502, and said common sun 2507 is drivingly engaged to the second set of planet gears 2503*b*1, 2503*b*2 and the first set of planet gears 2503*c*1, 2503*c*2, and wherein said second set of planet gears and said first set of planet gears are drivingly engaged to the ring gear 2503*c*1, wherein said compound planetary gear set 2503 is a coupling planetary gear set; and the ring gear 2503*d* is mechanically coupled to a differential 2520.

As previously described, FIG. 25 shows the layout for this seventh configuration (Configuration 7, Layout 1). The view is taken from the side of the vehicle. The input is always linked to the up-speed ratio 2501 going to the CVP 2504 and to the first member of the input coupling clutch 2505 (to engage the "reverse mode"). The CVP output is linked to the sun 2507 of the compound planetary 2503 (sun common for both planes of gears). A clutch 2506 allows braking of the second carrier 2509 to engage the direct forward mode. The first carrier 2508 of the planetary 2503 is linked to the down-speed ratio 2502 and might thus be connected to the ICE when the clutch 2505 is engaged, engaging the input coupling mode (reverse mode). The ring of the planetary 2503 is connected to the output of the transmission 2520.

Figure 23:
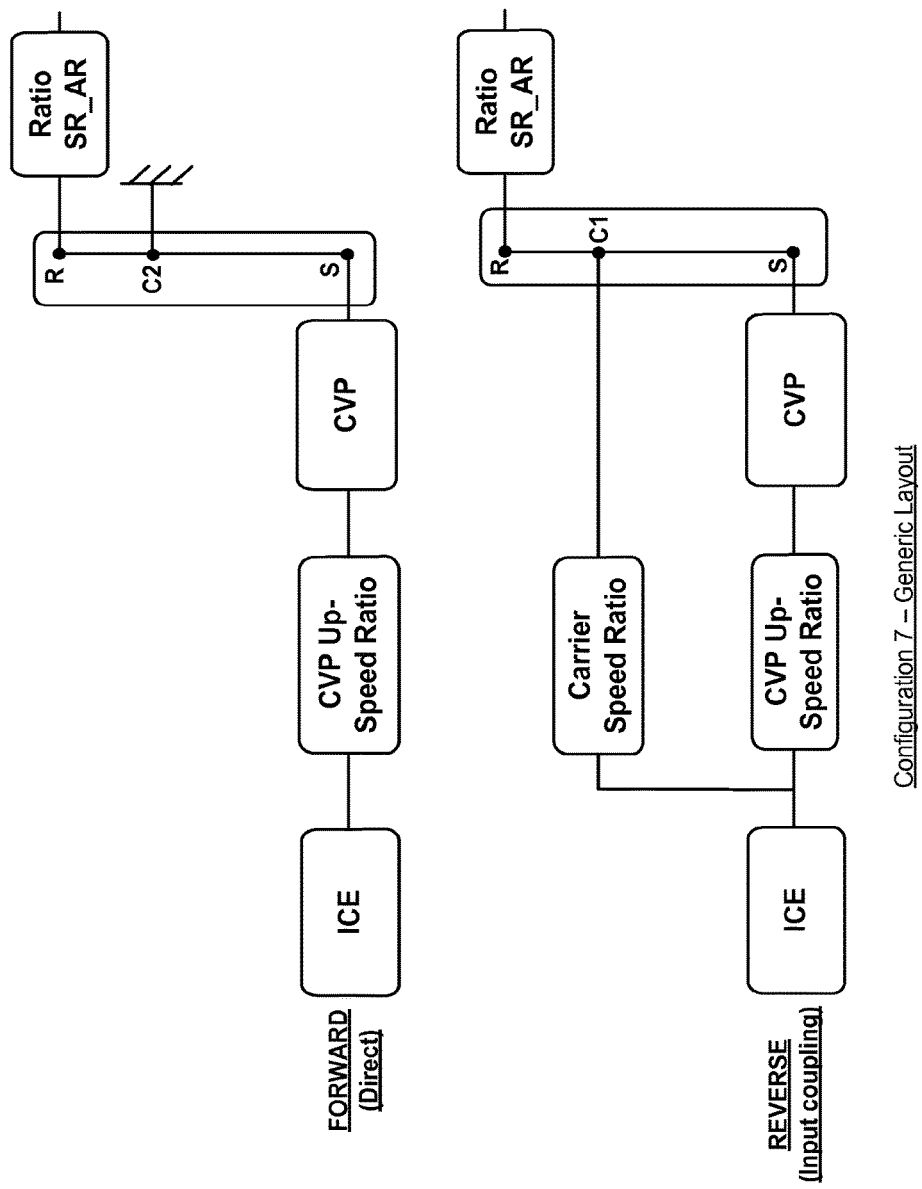
FIG. 23 is another illustrative example of an exemplary stick diagram powerpath based on a dual mode solution which includes a compound planetary gear set, each mode being selected by closing a clutch/brake and releasing the other.

This configuration, as illustrated in FIG. 23, is based on a dual mode solution, each mode being selected by closing a clutch/brake and releasing the other. The configuration also includes a compound planetary gear set. In each of the modes, the compound planetary gear set is acting as a simple planetary, one of its plane of gears being left free to turn. The forward mode is a direct CVP mode, engaged by locking the second carrier 2509 to the ground; the planetary thus acting as a simple gear ratio.

The reverse mode (also providing low forward speeds) is engaged by connecting the carrier of the first plane of gears of the planetary to the ICE, creating an input coupling planetary (R, C1, S for Ring, Carrier1 and Sun) that combines input from the ICE and from the CVP into an IVT output on the ring. The CVP is connected to the sun of the planetary on one side and to the ICE through an up-speed ratio on the other side. This up-speed ratio tends to increase the speeds and decrease the torque acting on the CVP, allowing decreasing the variator size. The ICE is also connected to the first carrier 2508 through a down-speed ratio in the reverse mode. It has to be noted that the naming of the modes as Forward and Reverse is arbitrarily made, in this case, the reverse mode also provides low forward speeds as well as a powered neutral. However, as this mode covers the whole reverse speed range it has been named Reverse.

The central part of that configuration is the variator described previously in the specification, and functions in the same way.

Figure 24:
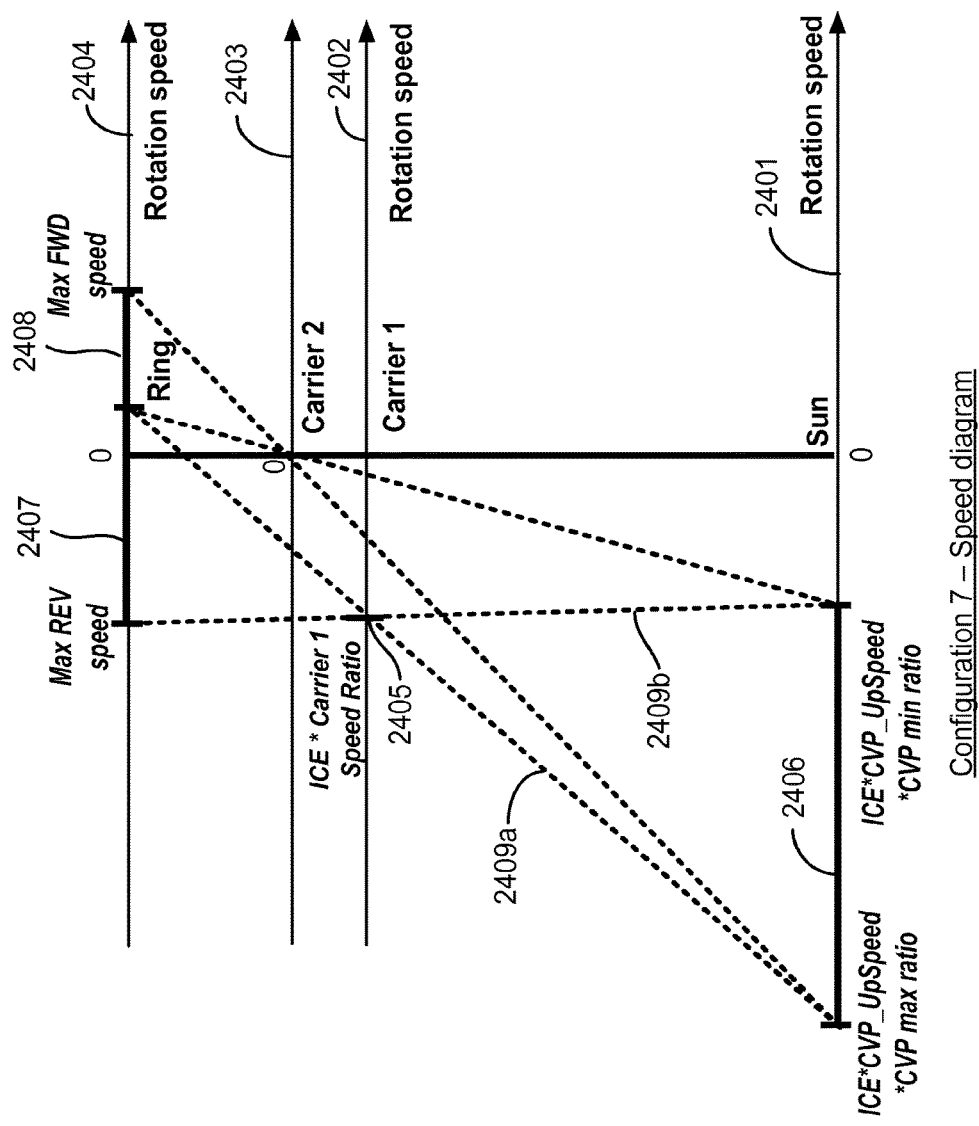
FIG. 24 is a graph of a speed diagram of the planetary gear set of the CVT of FIG. 23.

The speed diagram of the compound planetary gearset of this seventh configuration is illustrated in FIG. 24. The four horizontal axes represent respectively, from the bottom to the top, the sun rotation speed 2401, the first carrier rotation speed 2402, the second carrier rotation speed 2403, and the ring rotation speed 2404.

In the reverse mode, the first carrier is linked to the ICE through a speed ratio and then turns at the ICE speed times the carrier ratio, shown as a solid (blue) bar 2405 on the carrier 1 axis. The sun is connected to the output of the CVP and is thus turning at a speed included between the ICE speed times the minimum ratio of the CVP times the up-speed ratio (ICE*CVP_UpSpeed*CVP min ratio) and the ICE speed times the maximum speed ratio of the CVP times the up-speed ratio (ICE*CVP_UpSpeed*CVP max ratio). This speed interval 2406 is shown on the lower left (in red) on the sun axis.

In the reverse mode, the solid (green) interval 2407 on the left side of the ring axis shows the speed achievable by the ring depending on the variator speed ratio. A minimum speed ratio in the variator brings the ring speed to its maximum reverse speed while the maximum speed ratio in the CVP brings the ring speed to its maximum forward speed (in this mode). The (green) dotted lines 2409a, 2409b (on the left) show the limits achievable.

This mode is a power split mode, meaning that there are multiple power paths that will be used at the same time. A part of the power will flow through the CVP, the planetary sun, planet and going out through the ring while a certain amount of the power will directly flow through the carrier, planets and ring of the planetary.

In the forward mode, the carrier is decoupled from the ICE, by opening a clutch, and the carrier is coupled to the ground through a second clutch. The speeds achieved at the CVP output, on the sun of the planetary are thus multiplied by a speed ratio and applied to the ring. The output range is shown in solid (orange) line 2408 on the right side of ring axis. The maximum speed ratio of the CVP brings the ring to its maximum speed, while the minimum speed ratio brings it to the minimum forward speed of that mode (which is the same as the max forward speed of the "reverse" mode).

The design is made so that the maximum forward speed of the reverse mode corresponds to the minimum speed of the forward mode, allowing mode shifts without speed gap or overlap. However, a slight change in the gear ratios might provide overlap between the two modes or even a gap if this is needed for a specific reason. Additionally, it has to be noted that the shift speed is achieved in the reverse mode by the max speed ratio of the CVP and in the forward mode by the min speed ratio of the CVP. A speed ratio change has thus to occur in the CVP and the shift is not called synchronous as some elements will have to change their speed to be able to shift mode.

As described previously, FIG. 25 shows a layout for this seventh configuration 2500 (Configuration 7, Layout 1). The view is taken from the side of the vehicle. The input 2510 is always linked to the up-speed ratio 2501 going to the CVP 2504 and to the first member of the input coupling clutch 2505 (to engage the "reverse mode"). The CVP output is linked to the sun 2507 of the compound planetary 2503 (sun common for both planes of gears). A clutch 2506 allows braking of the second carrier 2509 to engage the direct forward mode. The first carrier 2508 of the planetary 2503 is linked to the down-speed ratio 2502 and might thus be connected to the ICE when the clutch 2505 is engaged, engaging the input coupling mode (reverse mode). The ring of the planetary 2503 is connected to the output of the transmission 2520.

Configuration 8, Layout 1—F14-11 Config. 1

Figure 28:
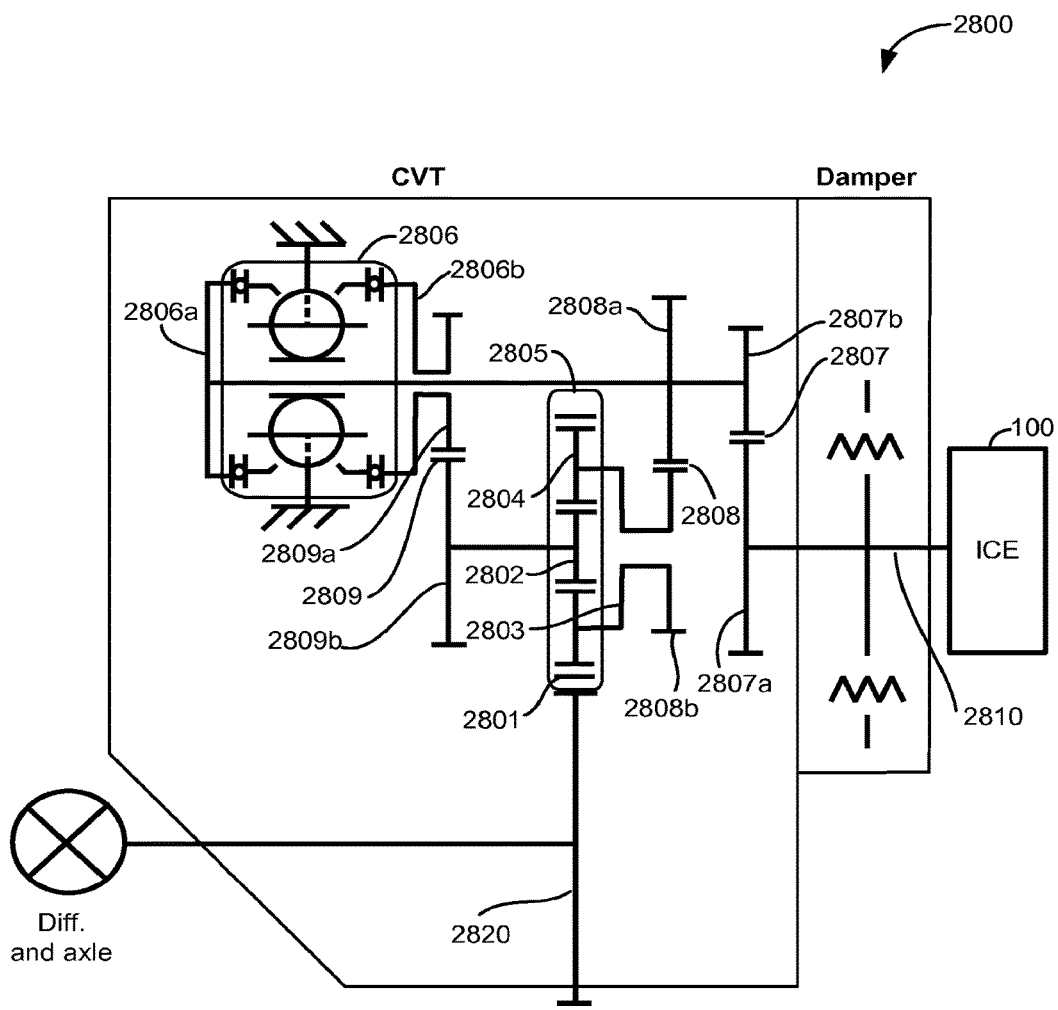
FIG. 28 is a block diagram of a continuously variable transmission (CVT) according to one embodiment of FIG. 26 used in a vehicle having an infinitely variable mode.

Provided herein is a variable transmission 2800, as illustrated in FIG. 28, comprising: an input shaft 2810 comprising a first gear 2807a of a first up-speed gear set 2807 drivingly engaged to a second gear 2807b on an offset shaft, said first up-speed gear set 2807 comprising the first gear 2807a and the second gear 2807b; wherein the second gear 2807b is coupled to a third gear 2808a of a second gear set 2808 along the offset shaft, comprising the third gear 2808a and a fourth gear 2808b, wherein the third gear 2808a is drivingly engaged to a first ring assembly 2806a of a variator 2806 disposed about the offset shaft, which in turn is coupled to a second ring assembly 2806b that is coupled to a third gear ratio 2809 comprising a fifth gear 2809a and a sixth gear 2809b), wherein the fifth gear 2809a is drivingly engaged to the sixth gear 2809b which is coupled to a sun gear 2802 of a planetary gear set 2805, the planetary gear set 2805 comprising the sun 2802, a set of planet gears 2804, coupled to a carrier 2803 and a ring gear 2801 is a coupling planetary: The carrier 2803 is linked to the ICE through the fourth gear 2808b of the second gear set 2808. The ICE down-speed ratio is thus the product of the gear ratios 2807 and 2808. The ring 2801 of the planetary gear set 2805 is mechanically coupled to a differential (2820) of the transmission.

As previously described, FIG. 28 shows the layout for this eighth configuration (Configuration 8, Layout 1). The view is taken from the side of the vehicle. The input 2810 is linked to an up-speed ratio 2807 used to increase the speed at the entrance of the CVP 2806. The carrier 2803 of the planetary 2805 is linked to the ICE 100 through a second gear ratio 2808. The ICE down-speed ratio is thus the product of two gear ratios 2807 & 2808 in this layout. The output of the CVP 2806 is linked to the sun 2802 of the planetary 2805. The ring 2801 of the planetary 2805 is linked to the output 2820 of the transmission.

This configuration is a power split configuration, meaning that there are multiple power paths that will be used at the same time. A part of the power will flow through the CVP 2806, the planetary sun 2802, planets 2804 and going out through the ring 2801, while a certain amount of the power will directly flow through the carrier 2803, planets 2804 and ring 2801 of the planetary. In addition to that, the closed loop present in the configuration will allow some power to recirculated, degrading the efficiency for certain ratios (ratios giving negative speeds on the ring).

Figure 26:
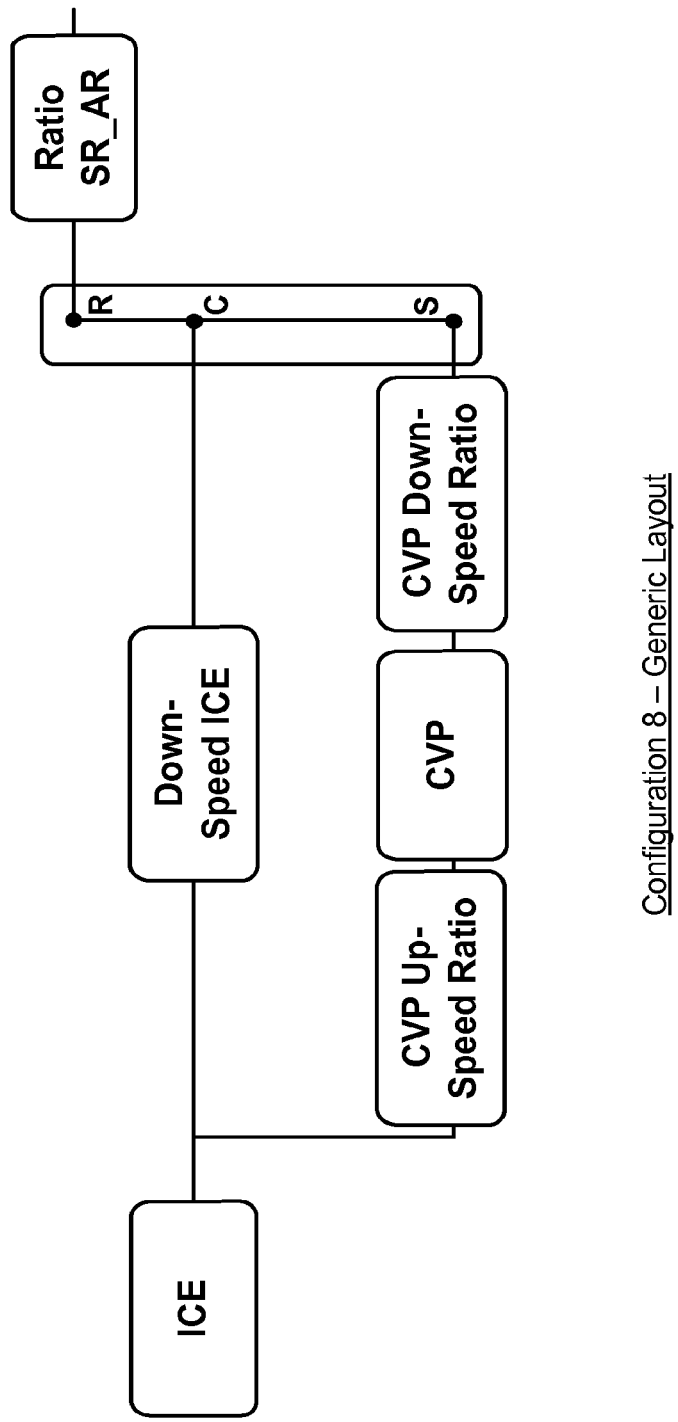
FIG. 26 is another illustrative example of an exemplary stick diagram powerpath based on an input coupling planetary (R, C, S, for Ring, Carrier and Sun) that combines input from the ICE and from the CVP into a symmetrical output. The CVP is connected to the sun of the planetary through a gear ratio on one side and to the ICE through an up-speed ratio on the other side. The Carrier is connected to the ICE through a down-speed ratio.

This configuration as illustrated in FIG. 26 is based on an input coupling planetary (R C S for Ring, Carrier and Sun) that combines input from the ICE and from the CVP into a symmetrical output. The CVP is connected to the sun of the planetary through a down-speed ratio on one side and to the ICE through an up-speed ratio on the other side. This up-speed ratio tends to increase the speeds and decrease the torque acting on the CVP, allowing a decrease in the variator size.

The central part of that configuration is the variator described previously in the document. A ball ramp on each side of the variator provides the clamping force necessary to transfer the torque. Thanks to the planetary, the configuration uses only a CVP and is able to provide standstill and reverse function as an IVP. No starting device like a slipping clutch or torque converter is required, since the IVP capability takes care of the starting function. However, these devices might be added to allow a safety disconnect or to start the engine. The ratio after the planetary is there to ensure that the maximum speeds and torques of the vehicle are still achieved.

Figure 27:
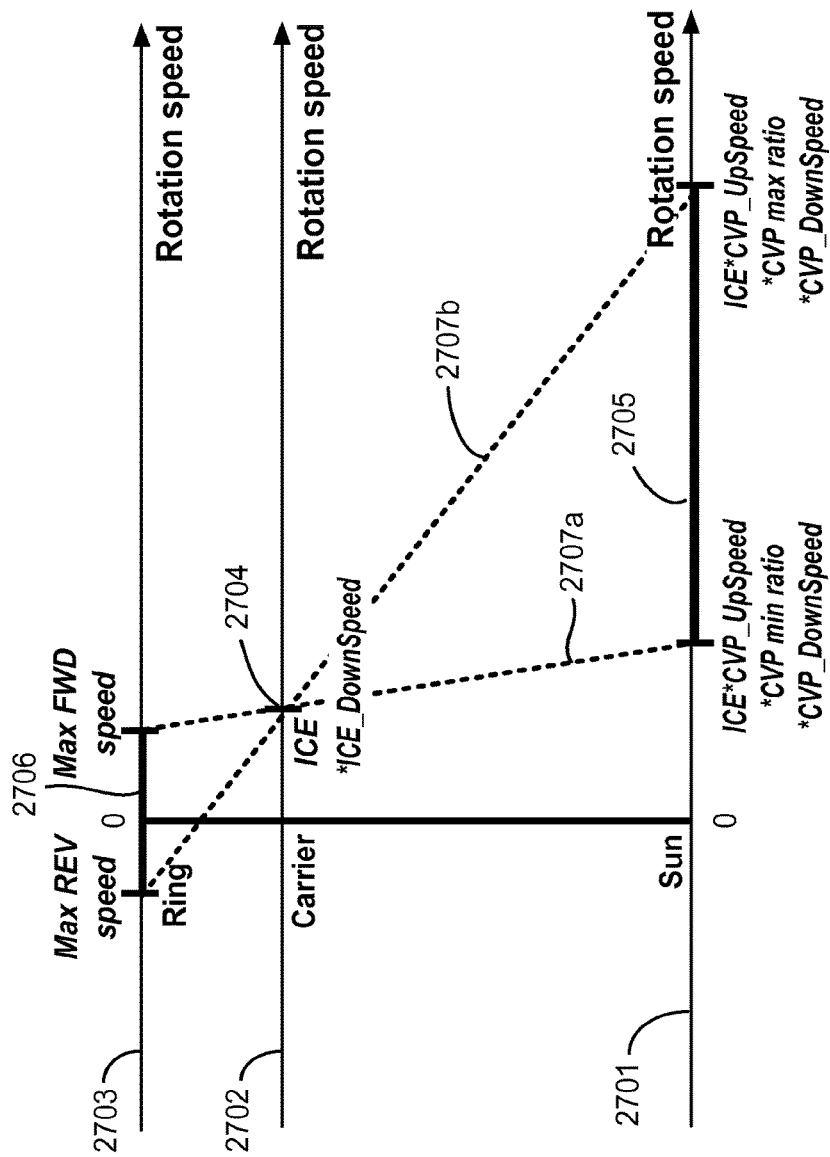
FIG. 27 is a graph of a speed diagram of the planetary gear set of the CVT of FIG. 26.

As illustrated in FIG. 27, the speed diagram of the planetary gearset, the three horizontal axes represent respectively, from the bottom to the top, the sun rotation speed 2701, the carrier rotation speed 2702 and the ring rotation speed 2703. The carrier is linked to the ICE*a down-speed ratio and then always turns at the ICE speed*down-speed ratio, shown as a solid (blue) bar 2704 on the carrier axis. The sun is connected to the output of the CVP and is thus turning at a speed included between the ICE speed times the minimum ratio of the CVP times the up-speed ratio times the down-speed ratio and the ICE speed times the maximum speed ratio of the CVP times the up-speed ratio times the down-speed ratio. This speed interval is a solid line 2705, on the right side of the Sun axis.

The solid (green) interval 2706 shown on the Ring axis shows the speed achievable by the ring depending on the variator speed ratio. A minimum speed ratio in the variator brings the ring speed to its maximum forward speed while the maximum speed ratio in the CVP brings the ring speed to its maximum reverse speed. The (blue) dotted lines 2707a, 2707b show the limits achievable. It can be observed that the amount of positive speeds achievable with that configuration is the same, or similar to the reverse speeds.

This configuration is a power split configuration, meaning that there are multiple power paths that will be used at the same time. A part of the power will flow through the CVP, the planetary sun, planet and going out through the ring while a certain amount of the power will directly flow through the carrier, planets and ring of the planetary. In addition to that, the closed loop present in the configuration will allow some power to recirculated, degrading the efficiency for certain ratios (ratios giving negative speeds on the ring).

Within this document is a new IVT configuration based on principle of using a planetary connected to the ICE and the CVP to allow powersplitting. An example of layout is shown but the invention is not restricted to this example and it is assumed that all the layouts that perform similarly to the speed diagrams and generic layouts are part of the invention as well.

This configuration allows having a better efficiency in one part of the output range, typically forward, due to the powersplitting. Additionally, these configurations and their different layouts provide a powered neutral ratio. The spread given through them is sufficient to allow the engine to operate at more optimal points, providing an improved fuel economy, while keeping the same operating speeds.

The configuration typically provides a symmetrical range of positive and negative speeds, a feature that is present in many applications such as forklifts. However, modifications of ratios in the gears and planetary gear sets would provide different forward and reverse speeds, allowing the use of this configuration in different applications.

This physical implementation is only an example, and this disclosure should not be restricted only to this example. One skilled in the art would see that variants of this layout might be used to achieve the same speed diagram while keeping the same working principle.

Configuration 9, Layout 1

Provided herein is a variable transmission 3100, comprising a first stage comprising; an input shaft 3101, a first gear set 3140 comprising a first gear 3141, a second gear 3142 and a countershaft 3143, wherein the first gear 3141 is drivingly engaged to the input shaft 3101 and drivingly engaged to the second gear 3142, and wherein the second gear is drivingly engaged to the countershaft 3143; a variator 3160 comprising a first ring assembly 3161 drivingly engaged to the countershaft 3143, a second ring assembly 3162 drivingly engaged to a third gear 3171 of a second gear set 3170, wherein said variator 3160 is disposed on the countershaft 3143; the second gear set 3170 comprising the third gear 3171 drivingly engaged to a fourth gear 3173, wherein the fourth gear is drivingly engaged to a planetary output shaft 3172 that is drivingly engaged to a sun gear 3152 of a planetary gear set 3150; and the planetary gear set 3150 comprising a carrier 3153, the sun gear 3152, a set of planet gears 3154, and a ring gear 3155, wherein the sun gear 3152 is drivingly engaged to the set of planet gears 3154, wherein the carrier 3153 is coupled to the input shaft 3101, wherein the set of planet gears 3154 are drivingly engaged to the ring gear 3155, wherein the ring gear 3155 is drivingly engaged to a second stage comprising; a forward/reverse mechanism 3200/3300, wherein the second stage forward/reverse mechanism is mechanically coupled to a transmission output 3180.

Figure 29:
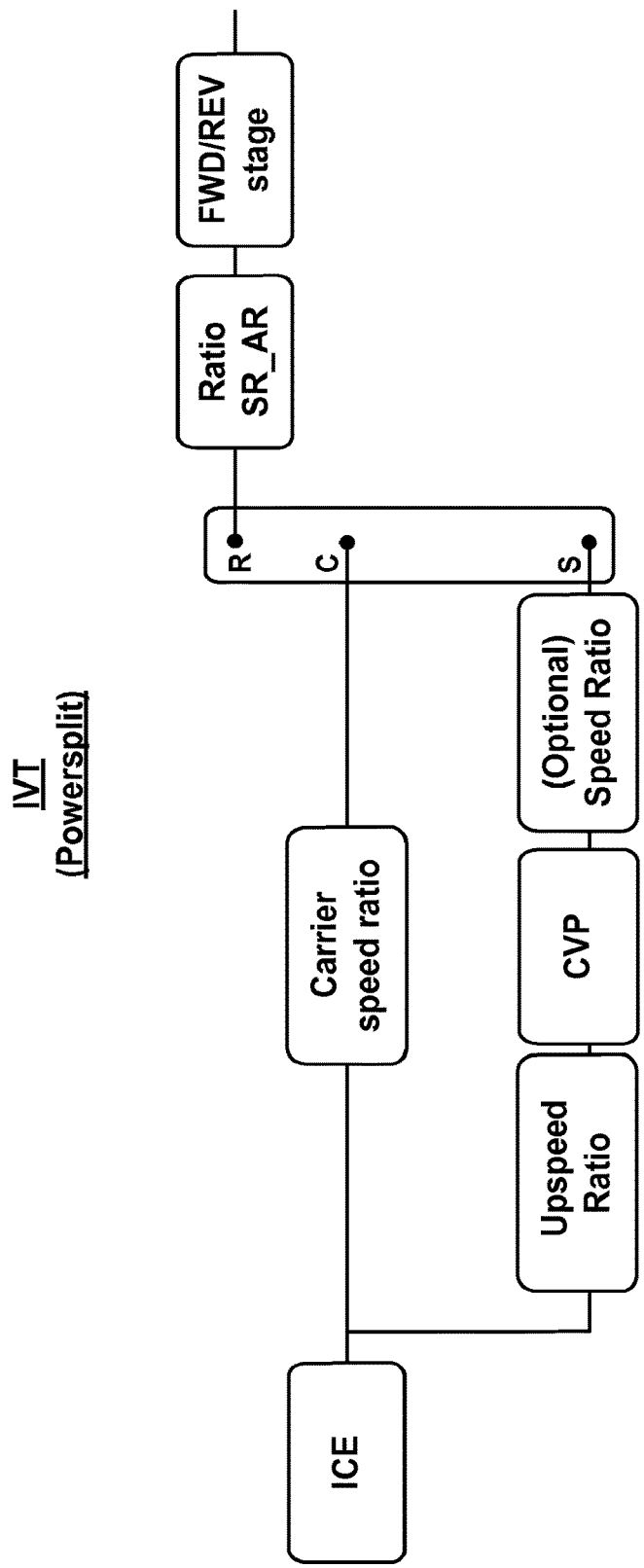
FIG. 29 is another illustrative example of an exemplary stick diagram powerpath based on an input-coupled planetary (R, C, S, for Ring, Carrier and Sun) that combines input from the ICE and from the CVP. The CVP is connected to the sun of the planetary directly or optionally through a down-speed ratio on one side and to the ICE directly or by an up-speed ratio on the other side.

As illustrated in FIG. 29, this transmission is based on an input-coupled planetary (R, C, S, for Ring, Carrier and Sun) that combines input from the ICE and from the CVP. The CVP is connected to the sun of the planetary directly or optionally through a down-speed ratio on one side and to the ICE directly or by an up-speed ratio on the other side. This up-speed ratio increases the speeds and decreases the torque acting on the CVP, resulting in a smaller variator size. Additionally, this transmission includes a secondary directional clutch stage, which consists of two clutches for forward and reverse driving.

The main component of this transmission is the variator 3160 described previously in the document. A ball ramp on each side of the variator provides the clamping force necessary to transfer the torque. Due to the planetary, the transmission is able to provide standstill and reverse function as an IVP. No starting device like a slipping clutch or torque converter is required, since the IVP capability handles the starting function. However, these devices could be added to allow a safety disconnect or to start the engine. A gear ratio after the planetary is used to achieve the maximum speeds and torques of the vehicle. The output of the transmission is made on the outer (i.e. ring) element 3155 of the planetary.

A primary difference in this transmission compared to previously described transmissions, is that the powersplit configuration alone does not cover the entire vehicle speed range. As shown in the speed diagram, the powersplit layout will cover only one half of the speed range (forward or reverse) and the other half will be covered by engaging one of the directional clutches of the secondary Forward/Reverse mechanism. Unlike other configurations, the secondary Forward/Reverse mechanism requires two clutches and related hydraulic components; e.g.: pump, filter, valve, etc.

In some embodiments, the variable transmission comprises an infinitely variable mode.

In some embodiments, the first gear set 3140 is an up-speed gear set. In some embodiments, an output speed of said first gear set is greater than an input speed of the input shaft.

In some embodiments, the planetary gear set 3150 is a coupling planetary gear set, wherein the output shaft 3172 is coupled to the sun 3152 and the input shaft 3101 is coupled through the carrier 3153 of the planetary gear set.

In some embodiments, a first part of the power from a power source will pass through the variator 3160, the sun 3152, the set of planet gears 3154, the ring gear 3155, and a second part of the power will pass directly through the carrier 3153, the set of planet gears 3154, and the ring gear 3155.

In some embodiments, the carrier turns at the same speed as an input speed of the input shaft. However, this is not necessarily the case for all potential configurations. In some cases the transmission may have a non-unity ratio, if desired which would result in the carrier turning at a different speed.

In some embodiments, the sun gear turns at a speed range between a speed of the input shaft multiplied by a minimum speed ratio of the variator multiplied by ratios of the first gear set and the second gear set, and the speed of the input shaft multiplied by a maximum speed ratio of the variator multiplied by the ratios of the first gear set and the second gear set.

In some embodiments, a power output going to the forward/reverse mechanism from the ring gear can go from forward direction to reverse direction through standstill thereby providing an infinitely variable mode.

In some embodiments, the variator is connected to the sun through a speed ratio of the second gear set on one side of the variator and connected to the input shaft through a speed ratio of the first gear set on the other side of the variator.

In some embodiments, a first gear set ratio of the first gear set causes the variator to turn the opposite direction of the input shaft, wherein the second gear set ratio of the second gear set causes the output of the variator to turn in the same direction as the input shaft.

In some embodiments, an up-speed ratio of the first gear set increases the speeds acting on the variator. In some embodiments, an up-speed ratio of the first gear set decreases the torque acting on the variator.

Figure 30:
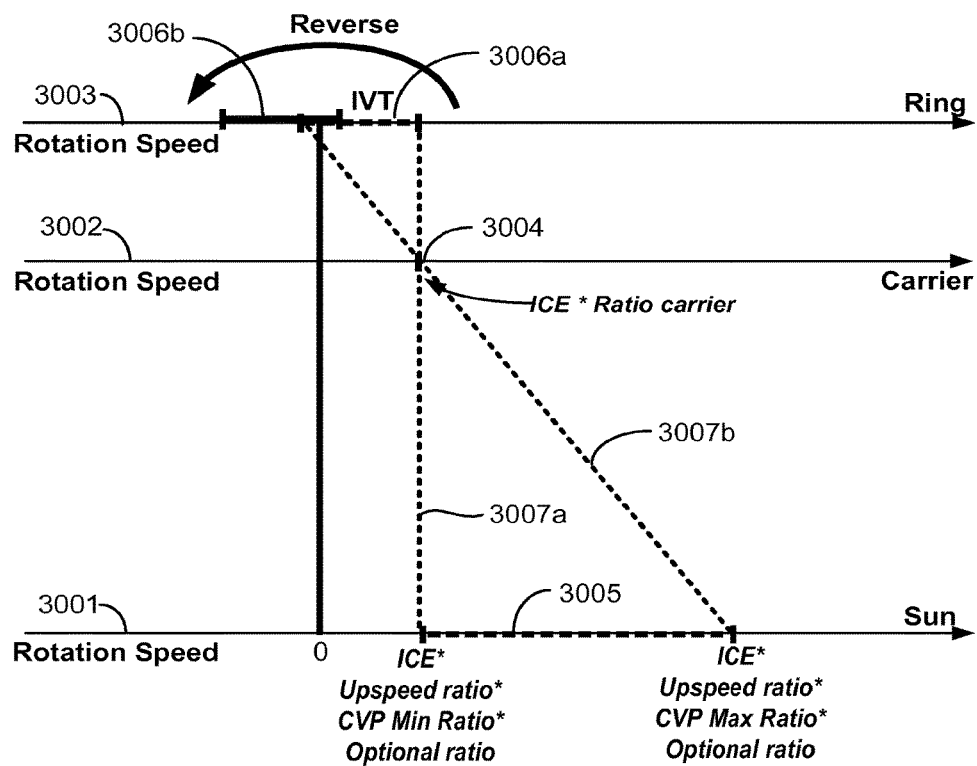
FIG. 30 is a graph of a speed diagram of the planetary gear set of the CVT of FIG. 29.
Figure 31:
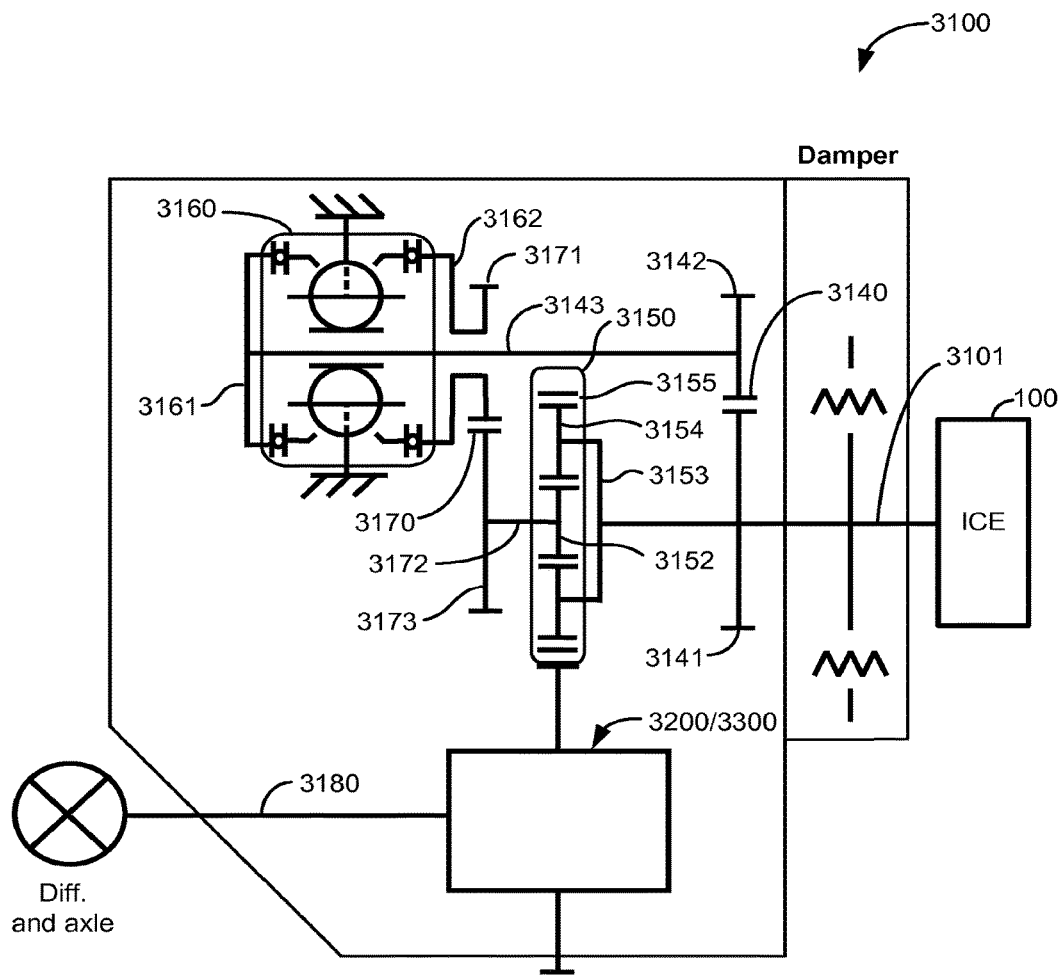
FIG. 31 is a block diagram of a continuously variable transmission (CVT) according to one embodiment of FIG. 29 used in a vehicle having an infinitely variable mode and a secondary Forward/Reverse mechanism.

As illustrated in FIG. 30, the speed diagram of the planetary gearset, the three horizontal axes represent respectively, from the bottom to the top, the sun rotation speed 3001, the carrier rotation speed 3002 and the ring rotation speed 3003. The carrier rotates at (ICE times an optional carrier-speed ratio), shown at 3004 on the carrier axis. The sun is connected to the output of the CVP and is thus turning at a speed between the ICE speed times the minimum ratio of the CVP) times the up-speed ratio times an optional down-speed ratio, 3007*a*, and the ICE speed times the maximum ratio of the CVP) times the up-speed ratio times an optional down-speed ratio, 3007*b*. This speed interval is shown at 3005 on the sun axis.

As a result of the planetary configuration, the ring (i.e. output) rotates in the speed interval shown at 3006*a*, depending on the variator speed ratio. If the Forward clutch is engaged, a maximum speed ratio of the CVP corresponds to slightly negative speed at the output while a minimum speed ratio in the CVP brings the IVT mode to its largest positive speed.

The second stage of the transmission (Forward/Reverse mechanism), comprises two simple directional clutches to select forward or reverse. Engaging the reverse clutch will mirror the 3006*a* interval, for the reverse region, as shown at 3006*b* on the speed diagram. A small overlap around zero speed is intentionally introduced in order to synchronize the speeds of all components during braking & directional shifts.

Figure 32:
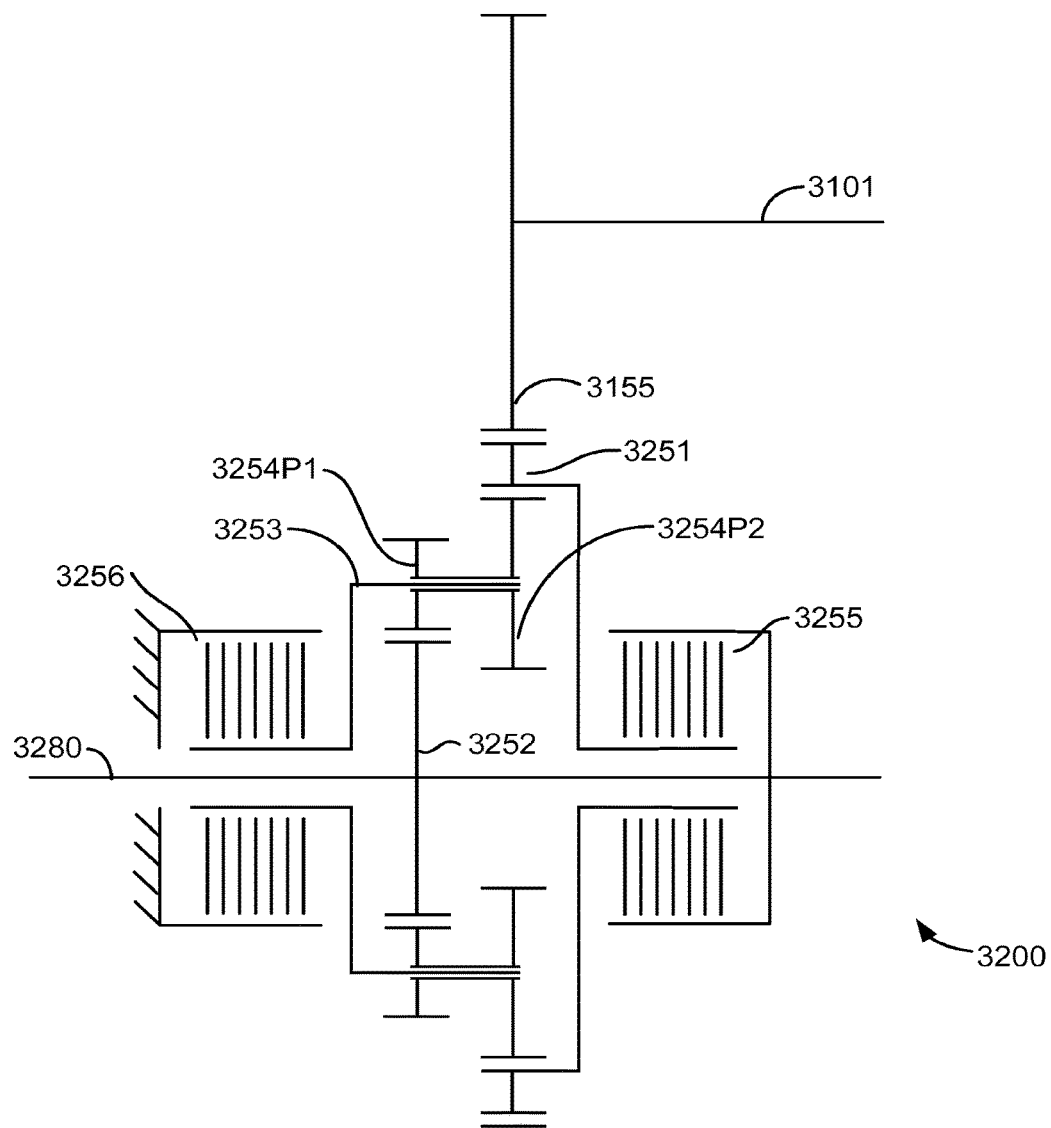
FIG. 32 is a block diagram of one possible embodiment for the secondary Forward/Reverse mechanism of FIG. 31.

This configuration is a power split configuration, meaning that the power will flow through multiple paths simultaneously. A part of the power will flow through the CVP (variable path), the planetary sun, planets and going out through the ring while a certain amount of the power will directly flow through the carrier, planets and ring of the planetary (mechanical path). In addition to that, the closed loop present in the configuration will allow some power to be recirculated, allowing for example a powered neutral functionality In some embodiments, the second stage forward/reverse mechanism comprises a planetary gear set, 3200. As illustrated in FIG. 32, the second stage planetary gear set comprises a sun gear 3252, a first set 3254P1 and a second set 3254P2 of planetary gears, a carrier 3253, a ring gear 3251, a forward directional clutch 3255, a reverse directional clutch 3256 and an output shaft 3280, wherein the sun gear 3252 is mounted on the output shaft 3280 and is drivingly engaged to the first set of planetary gears 3254P1 which are drivingly engaged to the second set of planetary gears 3254P2, wherein the carrier 3253 is coupled to a reverse directional clutch 3256 on one side of the planetary gear set and wherein the second set of planetary gears 3254P2 are drivingly engaged to the second stage planetary ring gear 3251 which is coupled to a forward directional clutch 3255 on the other side of the planetary gear set, wherein the second stage planetary ring gear 3251 is driven by the ring gear 3155 of the coupling planetary gear set 3150, and wherein the output shaft 3280 is coupled to the transmission output, such as a differential and axle.

When none of the clutches are engaged, components on output shaft 3280 can rotate freely and no torque is transferred to any component of the drive train such as the differential or the wheels. This condition can be used for disconnect functionality (e.g. towing).

When clutch (FWD) 3255 is closed, ring gear (R) 3251 is connected to output shaft (O) 3280, which rotates at a speed corresponding to the selected gear diameters. Input shaft (D) 3101 and output shaft (O) 3280 have opposite directions of rotation, providing a positive gear ratio.

When clutch (REV) 3256 is closed, carrier (C) 3253 is grounded. The compound planets 3254P1 and 3254P1 are driven by the internal gear of ring (R) 3251 and drive sun (S) 3252, which is mounted on output shaft (O) 3280. Due to the geometry of the planetary gear set, sun 3252 and ring 3251 will have opposite directions of rotation, causing input shaft 3101 and output shaft 3280 to have identical directions of rotation, providing a negative gear ratio. A negative ratio of −1 may be obtained by selecting gear ratios for sun, planets and ring which comply with following equation:

$$\frac{n_R}{n_S} = \frac{n_{P2}}{n_{P1}},$$

where $n_i$ represents the number of teeth of gear i.

Figure 33:
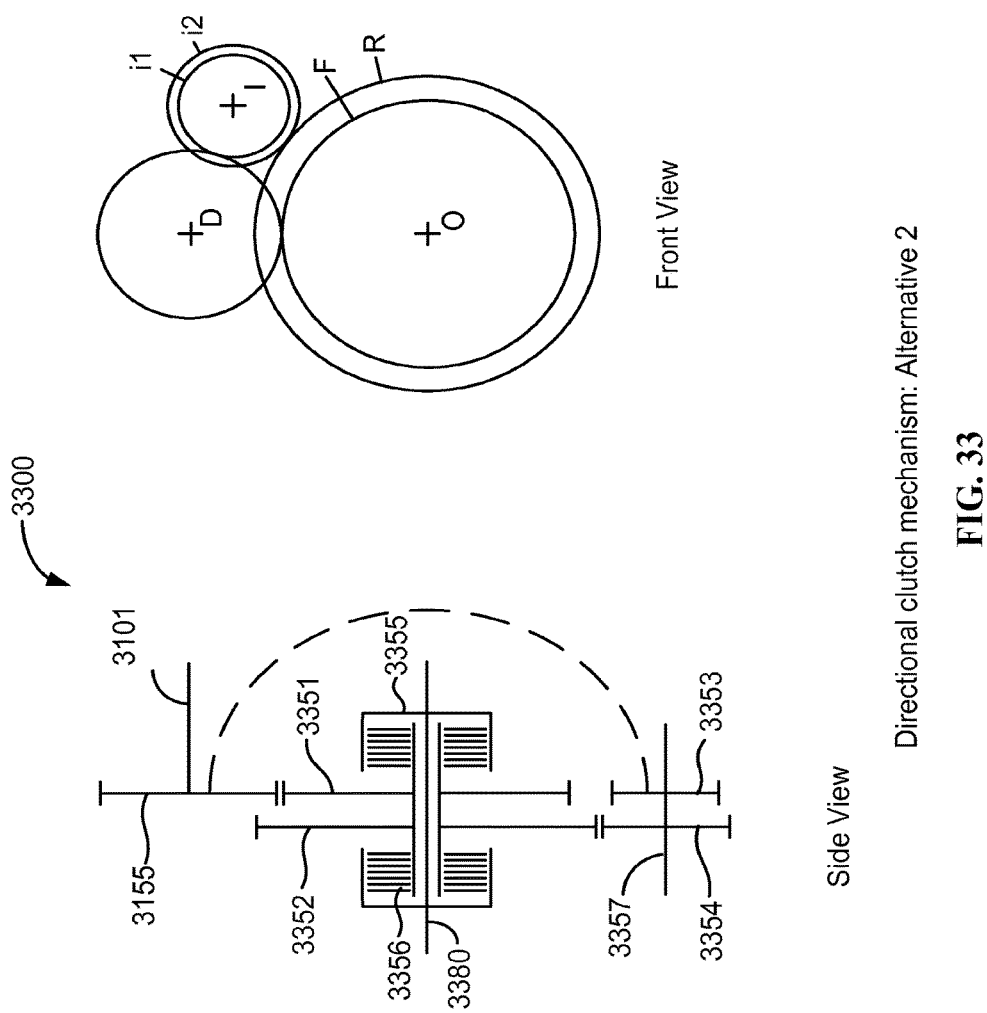
FIG. 33 is a block diagram of another possible embodiment for the secondary Forward/Reverse mechanism of FIG. 31.

Alternatively, as illustrated in FIG. 33, in some embodiments, the second stage forward/reverse mechanism 3300 comprises a forward gear 3351, a reverse gear 3352, a first idler gear 3353, a second idler gear 3354, an idler shaft 3357, a forward directional clutch 3355, a reverse directional clutch 3356 and an output shaft 3380, wherein the forward gear 3351 is mounted on the output shaft 3380 and drivingly engaged by the ring gear 3155 of the coupling planetary gear set (not shown), wherein the forward gear 3351 is coupled to a forward directional clutch 3355 on one side of the second stage forward/reverse mechanism 3300, the first idler gear 3353 is mounted on the idler shaft 3357 and drivingly engaged to the ring gear 3155, wherein the second idler gear 3354 is driven on the idler shaft 3357 and drivingly engaged to the reverse gear 3352 mounted about the output shaft 3380 and coupled to a reverse directional clutch 3356 on the other side of the second stage forward/reverse mechanism 3300, and wherein the output shaft 3380 is coupled to the transmission output, such as a differential and axle.

The illustrative mechanism comprises an input shaft (D) 3101, an output shaft (O) 3380 and an idler shaft (I) 3357. The output shaft further comprises spur gears (F) 3351 and (R) 3352 mounted on a hollow shaft concentric with output shaft (O) 3380, and clutches (FWD) 3355 and (REV) 3356. Idler shaft (I) 3357 comprises spur gears (i1) 3353 and (i2) 3354.

It is also noted that although the side view of FIG. 33 shows the idler shaft at the bottom, as if it would only mesh with the output shaft, it also meshes with the input shaft. This can be seen on the front view of FIG. 33. On the side view, the dotted line indicates that input shaft (D) meshes with spur gear (i1).

When combined with any of the other CVP gearboxes described herein, the input shaft (D) is driven by the output of said gearbox.

As with the alternative Planetary Gear Forward/Reverse mechanism, when none of the clutches are closed, all components on output shaft and idler shaft are able to rotate freely and no torque is transferred to any further components of the drive train such as the differential or the wheels.

When FWD clutch 3355 is closed, spur gear (F) 3351 is connected to output shaft (O) 3380. Input shaft (D) 3101 and output shaft (O) 3380 have opposite directions of rotation, providing a positive gear ratio.

When REV clutch 3356 is closed, spur gear (R) 3352 is connected to output shaft (O) 3380, and is driven by input shaft (D) 3101 through spur gears (i1) 3353 and (i2) 3354. Input shaft (D) 3101 and output shaft (O) 3380 have identical directions of rotation, providing a negative gear ratio. A negative ratio of −1 may be obtained by selecting gear ratios which comply with the following equation:

$$\frac{n_R}{n_P} = \frac{n_{i2}}{n_{i1}},$$

where $n_i$ represents the number of teeth of gear i.

In some embodiments, the first stage of the transmission produces a speed range between a small negative speed and a maximum positive speed.

In some embodiments, the second stage forward/reverse mechanism produces maximum reverse speeds by mirroring the asymmetrical speed range of the first stage.

In some embodiments, the gear ratio of the second stage forward/reverse mechanism can be changed to reduce the maximum forward and reverse speeds.

In some embodiments, the variable transmission further comprises a torsional damper, wherein said torsional damper is located between an input power source and the variator to avoid or reduce transferring torque peaks and vibrations from the input power source to one or more of the input shaft, the first gear set, the variator, the second gear set, and the planetary gear set.

In some embodiments, the torsional damper is coupled with a clutch.

This IVT configuration is based on the principle of using a planetary gear set connected to the power source; a CVP to allow powersplit function; and directional clutches to determine the output direction. An example layout is shown but the invention is not restricted to these examples, as would be clear to one skilled in the art upon viewing this disclosure, and it is assumed that all layouts that perform similarly to the speed diagrams and generic layouts as described herein are part of the invention as well.

As described herein, the directional shift mechanism can be added to the output of each single- or multi-mode powersplit IVT design. Gear ratios and the RTS (Ring-to-Sun) ratio of the planetary gearset need to be adjusted to cover only half of the speed range (either forward or reverse), with some additional overlap on the other direction (to allow synchronization during a direction change). The amount of overlap can be adjusted depending on vehicle requirements.

The configurations with directional shift mechanism as described herein will consist of two main stages. The first stage is a single- or multi-mode powersplit gearbox while the second stage corresponds to two directional clutches for the forward and reverse. The direction selection in the second stage is made by engaging one of the two directional clutches while releasing the other.

The powersplit functionality is maintained in these layouts which will provide improved efficiency. Additionally, these configurations still provide a powered neutral ratio, which is a typical requirement in Off Highway applications. Advanced controls on the CVP device allow the engine to operate at optimal zones, providing better fuel economy.

This directional shift configuration provides the advantage of synchronization during a directional shift from forward to reverse, or vice versa, by slipping one or two of the clutches. To enable this synchronization, the overlap (at both sides, F and R) around zero speed can be configured as required. The clutch control is also applicable for braking in order to dissipate energy in the transmission and to control the desired deceleration. Furthermore, these clutches can also be used as a torque limiter. The clutch components can be designed so that in case of excessive torques, the clutch plates can start slipping, limiting the torque on the CVP and other transmission components, protecting the variator and improving durability/life of said components. Additionally these clutches can also provide the functionality of "disconnect" on the output side, by disengaging both clutches and allowing free rotation. By providing all these functionalities with the clutches, there will be no more need for additional components for braking, safety disconnect and torque fuse.

The operational trade-off between the earlier configurations and the last configurations introduced here with a directional stage is mainly complexity (cost & mechanical/physical constraints) vs. CVP size (operating torques), better efficiency, and additional functionalities (towing, braking etc.).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A continuously variable planetary transmission comprising:
   an input shaft;
   a first planetary gear set comprising a first carrier drivingly engaged to the input shaft, a first sun gear drivingly engaged to a first set of planet gears which are engaged to a first ring gear, wherein the first ring gear is fixed to a first casing of the first planetary gear set, and wherein a first ring assembly of a variator is drivingly engaged to the first sun of the first planetary gear set;
   the variator comprising a plurality of variator balls mounted on axes, themselves held in a cage or variator carrier allowing changing of an input or output ratio by tilting the variator balls' axes, the first ring assembly and a second ring assembly that is drivingly engaged to a second sun gear of a second planetary gear set; and
   the second planetary gear set comprising the second sun that is drivingly engaged to a second set of planet gears, and a second carrier coupled to the input shaft, wherein the second set of planet gears is drivingly engaged to a second ring gear of the second planetary gear set, and wherein said second ring gear is mechanically coupled to a differential.

2. The variable transmission of claim 1, comprising an infinitely variable mode.

3. The variable transmission of claim 1, wherein the first planetary gear set is an up-speed planetary gear set.

4. The first planetary gear set of claim 3, wherein an output of speed of said first planetary gear set is greater than an input shaft speed of the input shaft.

5. The variable transmission of claim 1, wherein the second planetary gear set is a coupling planetary gear set, wherein an output of the variator is coupled to the second sun and coupled to the input shaft through the second carrier.

6. The variable transmission of claim 1, wherein a first part of power from a power source will pass through the variator, the second planetary sun, second set of planet gears and second ring gear, and a second part of the power will pass directly through the second planetary carrier, second set of planet gears and second ring gear.

7. The variable transmission of claim 1, wherein the second carrier turns at the same speed as the input shaft.

8. The variable transmission of claim 1, wherein the second sun gear turns at a speed range between
   a speed of the input shaft multiplied by a minimum speed ratio of the variator multiplied by an up-speed ratio of the first planetary gear set and
   the speed of the input shaft multiplied by a maximum speed ratio of the variator multiplied by the up-speed ratio of the first planetary gear set.

9. The variable transmission of claim 1, wherein a power output going to the differential from the second ring can go from a forward direction to a reverse direction through standstill thereby providing an infinitely variable mode.

10. The variable transmission of claim 1, wherein an up-speed ratio gear set increases speeds acting on the variator.

11. The variable transmission of claim 1, wherein an up-speed ratio gear set decreases the torque acting on the variator.

12. The variable transmission of claim 1, wherein a minimum speed ratio in the variator brings a ring speed of the ring gear of the planetary gear set on an output side of the variator to a maximum forward speed while the maximum speed ratio in the variator brings the ring speed of the ring gear of the planetary gear set on the output side of the variator to a maximum reverse speed.

13. The variable transmission of claim 1, further comprising a torsional damper drivingly connected to an input power source, wherein said torsional damper is located between the input power source and the variator to avoid or reduce transferring torque peaks and vibrations from the input power source to one or more of the input shaft, the first planetary gear set, the variator, and the secondary planetary gear set.

14. The variable transmissions of claim 1, wherein said transmission provides a powered neutral ratio.

15. The variable transmission of claim 1, wherein said torsional damper is coupled with a clutch.

16. The variable transmission of claim 1, wherein the variator works with a traction fluid lubricant, wherein the lubricant between the balls and the first and second ring assemblies acts as a solid at high pressure, transferring the power from the first ring assembly, through the variator balls, to the second ring assembly.

* * * * *